US012601587B2

(12) United States Patent (10) Patent No.: US 12,601,587 B2
Ishigaki et al. (45) Date of Patent: Apr. 14, 2026

(54) THREE-DIMENSIONAL MEASUREMENT DEVICE

(71) Applicant: CKD CORPORATION, Aichi (JP)

(72) Inventors: Hiroyuki Ishigaki, Aichi (JP); Ikuo Futamura, Aichi (JP); Takahiro Mamiya, Aichi (JP)

(73) Assignee: CKD Corporation, Aichi (JP)

( * ) Notice: Subject to any disclaimer, the term of this patent is extended or adjusted under 35 U.S.C. 154(b) by 294 days.

(21) Appl. No.: 18/177,754

(22) Filed: Mar. 2, 2023

(65) Prior Publication Data

US 2023/0204345 A1 Jun. 29, 2023

Related U.S. Application Data

(63) Continuation of application No. PCT/JP2021/022975, filed on Jun. 17, 2021.

(30) Foreign Application Priority Data

Sep. 4, 2020 (JP) ................................. 2020-149129

(51) Int. Cl.
G01B 11/24 (2006.01)
G01B 9/023 (2006.01)
(Continued)

(52) U.S. Cl.
CPC .......... G01B 11/2441 (2013.01); G01B 9/023 (2013.01); G01B 11/25 (2013.01); G06T 7/70 (2017.01); *G06T 2207/30148* (2013.01)

(58) Field of Classification Search
CPC .... G01B 11/2441; G01B 9/023; G01B 11/25; G01B 9/02091; G01B 9/02047;
(Continued)

(56) References Cited

U.S. PATENT DOCUMENTS 9,488,524 B2 * 11/2016 Ishimaru ............... G01J 3/0256
11,118,895 B2 * 9/2021 Ishigaki ................. G01B 9/021
(Continued)

FOREIGN PATENT DOCUMENTS

JP S5958305 A 4/1984
JP 2009-516171 A 4/2009
(Continued)

OTHER PUBLICATIONS

Office Action issued in counterpart Japanese Patent Application No. JP 2020-149129 mailed Jan. 5, 2022 (4 pages).
(Continued)

*Primary Examiner* — Tarifur R Chowdhury
*Assistant Examiner* — Kemaya Nguyen
(74) *Attorney, Agent, or Firm* — Osha Bergman Watanabe & Burton LLP

(57) ABSTRACT

A three-dimensional measurement device includes: an irradiator that emits a predetermined light; an optical system that splits the predetermined light into two lights, irradiates a measurement object with a measurement light and irradiates a reference plane with a reference light, and emits a combined light; an imaging device that takes an image of the combined light and obtains an interference fringe image; an objective lens for the measurement light that directs the measurement light toward the measurement object; an objective lens for the reference light that directs the reference light toward the reference plane; an imaging lens that forms an image of the combined light on the imaging device; and a control device that executes three-dimensional measurement of a measurement area on the measurement object based on the interference fringe image.

6 Claims, 18 Drawing Sheets

(51) Int. Cl.
    *G01B 11/25* (2006.01)
    *G06T 7/70* (2017.01)
(58) Field of Classification Search
    CPC .. G01B 9/02083; G01B 9/021; G01B 11/022;
                G01B 2210/56; G06T 7/70; G06T
          2207/30148; G06T 7/521; G06T 17/00
    See application file for complete search history.

(56) References Cited

U.S. PATENT DOCUMENTS

| | | | |
|---|---|---|---|
| 2007/0046953 A1* | 3/2007 | De Groot | G01B 9/0209 |
| | | | 356/512 |
| 2016/0091304 A1* | 3/2016 | Matsui | G01B 11/2441 |
| | | | 356/511 |
| 2018/0038685 A1* | 2/2018 | Torri | G01B 11/2518 |
| 2019/0178625 A1* | 6/2019 | Ishigaki | G01N 21/956 |
| 2019/0219379 A1* | 7/2019 | Ishigaki | G01B 11/24 |
| 2019/0293954 A1* | 9/2019 | Lin | G02B 27/30 |

FOREIGN PATENT DOCUMENTS

| | | | |
|---|---|---|---|
| JP | 2016-070851 A | 5/2016 | |
| JP | 2019-100961 A | 6/2019 | |
| WO | 2014/185133 A1 | 11/2014 | |
| WO | WO-2019111453 A1 * | 6/2019 | ............. G01B 11/24 |

OTHER PUBLICATIONS

International Search Report issued in corresponding International Application No. PCT/JP2021/022975 mailed Sep. 14, 2021 (6 pages).

Written Opinion issued in corresponding International Application No. PCT/JP2021/022975 mailed Sep. 14, 2021 (4 pages).

International Preliminary Report on Patentability issued in corresponding International Patent Application No. PCT/JP2021/022975 dated Mar. 7, 2023 (10 pages).

* cited by examiner

⊙    Polarized light (S-polarized light) in a direction
     perpendicular to the sheet surface ↕    Polarized light (P-polarized light) in a direction
     parallel to the sheet surface ↻    Circularly polarized light ⤢    Polarized light in a direction entering obliquely
     to the sheet surface ⊙    Polarized light (S-polarized light) in a direction perpendicular to the sheet surface ↕    Polarized light (P-polarized light) in a direction parallel to the sheet surface ↻    Circularly polarized light ⤢    Polarized light in a direction entering obliquely to the sheet surface

FIG. 5

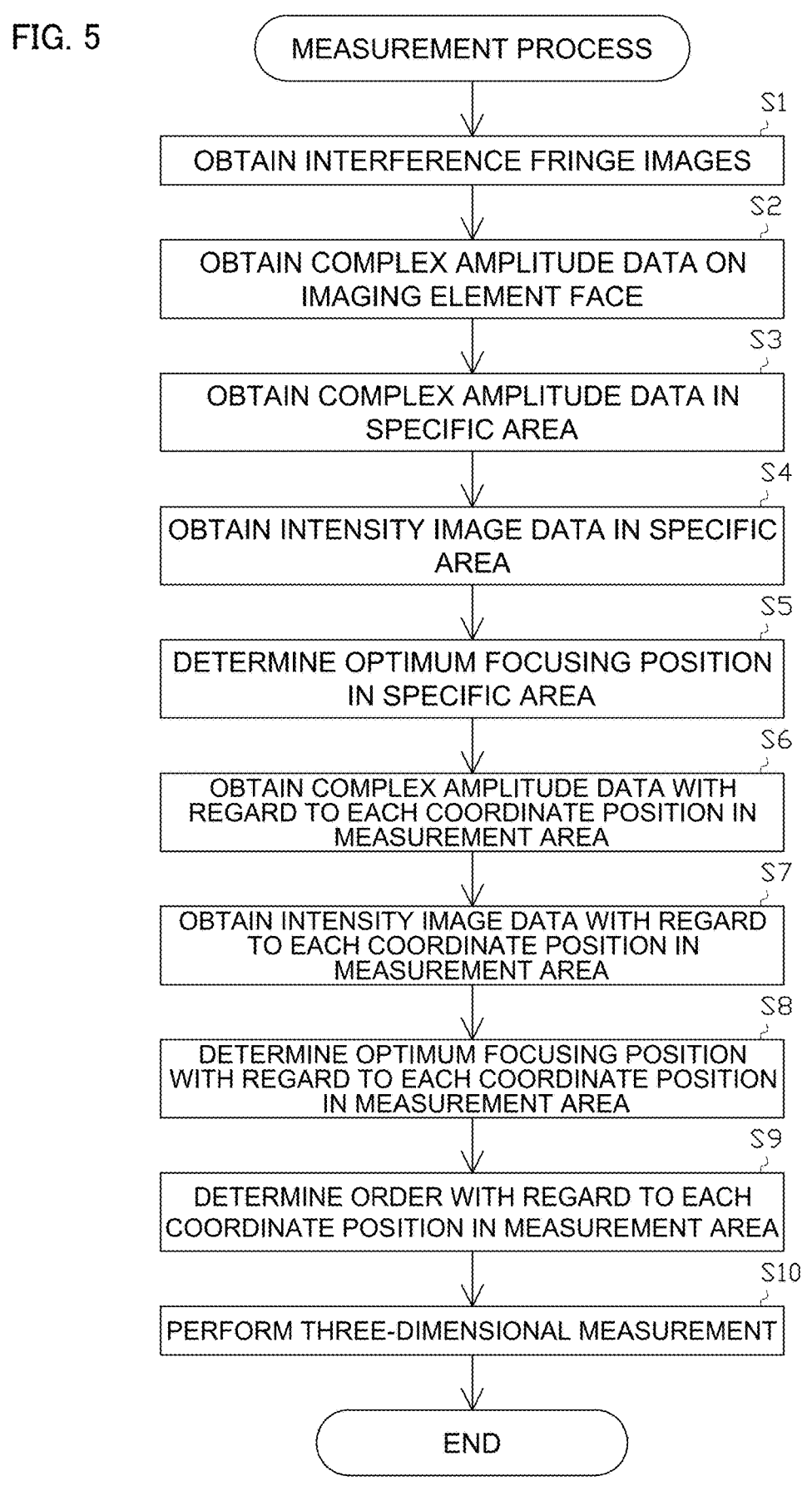

MEASUREMENT PROCESS

S1
OBTAIN INTERFERENCE FRINGE IMAGES

S2
OBTAIN COMPLEX AMPLITUDE DATA ON IMAGING ELEMENT FACE

S3
OBTAIN COMPLEX AMPLITUDE DATA IN SPECIFIC AREA

S4
OBTAIN INTENSITY IMAGE DATA IN SPECIFIC AREA

S5
DETERMINE OPTIMUM FOCUSING POSITION IN SPECIFIC AREA

S6
OBTAIN COMPLEX AMPLITUDE DATA WITH REGARD TO EACH COORDINATE POSITION IN MEASUREMENT AREA

S7
OBTAIN INTENSITY IMAGE DATA WITH REGARD TO EACH COORDINATE POSITION IN MEASUREMENT AREA

S8
DETERMINE OPTIMUM FOCUSING POSITION WITH REGARD TO EACH COORDINATE POSITION IN MEASUREMENT AREA

S9
DETERMINE ORDER WITH REGARD TO EACH COORDINATE POSITION IN MEASUREMENT AREA

S10
PERFORM THREE-DIMENSIONAL MEASUREMENT

END

FIG. 11

MEASUREMENT RANGE: IN THE CASE OF 1000 nm

| ACTUAL HEIGHT [nm] | PHASE [°] | ORDER | RECONSTRUCTED IMAGE NUMBER | LUMINANCE VALUE OF RECONSTRUCTED IMAGE   CASE 1 | LUMINANCE VALUE OF RECONSTRUCTED IMAGE   CASE 2 |
|---|---|---|---|---|---|
| 3500 | 180 | | | | |
| 3250 | 90 | | | | |
| 3000 | 0 | 3 | $H_3$ ① | 135 | 64 |
| 2750 | −90 | | | | |
| 2500 | −180 | | | | |
| 2500 | 180 | | | | |
| 2250 | 90 | | | | |
| 2000 | 0 | 2 | $H_2$ ② | 250 | 128 |
| 1750 | −90 | | | | |
| 1500 | −180 | | | | |
| 1500 | 180 | | | | |
| 1250 | 90 | | | | |
| 1000 | 0 | 1 | $H_1$ ③ | 128 | 128 |
| 750 | −90 | | | | |
| 500 | −180 | | | | |
| 500 | 180 | | | | |
| 250 | 90 | | | | |
| 0 | 0 | 0 | $H_0$ ④ | 64 | 64 |
| −250 | −90 | | | | |
| −500 | −180 | | | | |
| −500 | 180 | | | | |
| −750 | 90 | | | | |
| −1000 | 0 | −1 | $H_{-1}$ ⑤ | 32 | 32 |
| −1250 | −90 | | | | |
| −1500 | −180 | | | | |
| −1500 | 180 | | | | |
| −1750 | 90 | | | | |
| −2000 | 0 | −2 | $H_{-2}$ ⑥ | 16 | 16 |
| −2250 | −90 | | | | |
| −2500 | −180 | | | | |
| −2500 | 180 | | | | |
| −2750 | 90 | | | | |
| −3000 | 0 | −3 | $H_{-3}$ ⑦ | 8 | 8 |
| −3250 | −90 | | | | |
| −3500 | −180 | | | | |

FIG. 12

MEASUREMENT RANGE: IN THE CASE OF 1000 nm

| ACTUAL HEIGHT [nm] | PHASE [°] | ORDER | RECONSTRUCTED IMAGE NUMBER | LUMINANCE VALUE OF RECONSTRUCTED IMAGE CASE 1 | LUMINANCE VALUE OF RECONSTRUCTED IMAGE CASE 2 |
|---|---|---|---|---|---|
| 3500 | 180 | | | | |
| 3250 | 90 | | | | |
| 3000 | 0 | 3 | $H_3$ ① | 135 | 64 |
| 2750 | −90 | | | | |
| 2500 | −180 | | | | |
| 2500 | 180 | | | | |
| 2250 | 90 | | | | |
| 2000 | 0 | 2 | $H_2$ | | |
| 1750 | −90 | | | | |
| 1500 | −180 | | | | |
| 1500 | 180 | | | | |
| 1250 | 90 | | | | |
| 1000 | 0 | 1 | $H_1$ ② | 128 | 128 |
| 750 | −90 | | | | |
| 500 | −180 | | | | |
| 500 | 180 | | | | |
| 250 | 90 | | | | |
| 0 | 0 | 0 | $H_0$ | | |
| −250 | −90 | | | | |
| −500 | −180 | | | | |
| −500 | 180 | | | | |
| −750 | 90 | | | | |
| −1000 | 0 | −1 | $H_{-1}$ ③ | 32 | 32 |
| −1250 | −90 | | | | |
| −1500 | −180 | | | | |
| −1500 | 180 | | | | |
| −1750 | 90 | | | | |
| −2000 | 0 | −2 | $H_{-2}$ | | |
| −2250 | −90 | | | | |
| −2500 | −180 | | | | |
| −2500 | 180 | | | | |
| −2750 | 90 | | | | |
| −3000 | 0 | −3 | $H_{-3}$ ④ | 8 | 8 |
| −3250 | −90 | | | | |
| −3500 | −180 | | | | |

FIG. 21

| | | LUMINANCE OF MEASUREMENT POINT | |
|---|---|---|---|
| | RECONSTRUC-TION DISTANCE | CONVENTIONAL | PRESENT DISCLOSURE |
| 3RD | +90μm | 104 | 44 |
| 2ND | +60μm | 112 | 72 |
| 1ST | +30μm | 120 | 100 |
| 0TH | ±0μm | 128 | 128 |
| -1ST | -30μm | 120 | 100 |
| -2ND | -60μm | 112 | 72 |
| -3RD | -90μm | 104 | 44 |

THREE-DIMENSIONAL MEASUREMENT DEVICE

BACKGROUND

Technical Field

The present disclosure relates to a three-dimensional measurement device configured to measure the shape of an object to be measured or a measurement object.

Description of Related Art

One conventionally known three-dimensional measurement device configured to measure the shape of a measurement object is, for example, an interference-type three-dimensional measurement device that takes advantage of the technique of digital holography to perform height measurement of bumps of a semiconductor wafer (refer to, for example, Patent Literature 1).

This type of three-dimensional measurement device enables height measurement of a bump exceeding a measurement range to be performed by one-shot imaging without requiring a moving mechanism of a reference plane, a galvanic mechanism or the like.

PATENT LITERATURE

Patent Literature 1: JP 2019-100961A

In three-dimensional measurement using the technique of digital holography, it is required to specify a reconstructed image in a focusing state among a plurality of reconstructed images (intensity image data reconstructed with regard to a plurality of positions in a height direction). Accordingly, it is important to detect the luminance of a measurement point.

In the configuration described in Patent Literature 1, however, there is no significant difference between luminances of the plurality of reconstructed images. This makes it difficult to specify which reconstruction position is a focusing position (or an optimum focusing position where an image is most focused in the height direction). As a result, this is likely to reduce the measurement accuracy.

Especially, when part of the measurement object is curved like the bump described above, the light which the curved portion is irradiated with is diffused. This reduces the amount of the reflected light to be detected and is thus likely to make the phenomenon described above more noticeable.

SUMMARY

One or more embodiments of the present disclosure provide a three-dimensional measurement device that improves the measurement accuracy and enhances the measurement efficiency.

The following describes each of various aspects provided adequately in view of above issues. Functions and advantageous effects that are characteristic of each of the aspects are also described as appropriate.

Aspect 1. There is provided a three-dimensional measurement device, comprising: a predetermined optical system (a specific optical system) configured to split a predetermined light entering therein into two lights, to irradiate a measurement object (for example, a wafer substrate) with one of the two lights as a measurement light and irradiate a reference plane with the other of the two lights as a reference light, and to combine the measurement light and the reference light with each other and emit a combined light; an irradiation unit (or irradiator) configured to emit the predetermined light that enters the predetermined optical system; an imaging unit (or imaging device) configured to take an image of an output light (combined light) emitted from the predetermined optical system and obtains an interference fringe image; an objective lens for the measurement light configured to direct and radiate the measurement light toward the measurement object; an objective lens for the reference light configured to direct and radiate the reference light toward the reference plane; an imaging lens configured to form an image of the output light (combined light) onto the imaging unit (an imaging element of the imaging unit); and an image processing unit (or control device) configured to perform (execute) three-dimensional measurement with regard to (of) a predetermined measurement area of (on) the measurement object (the entirety or part of the measurement object), based on an interference fringe image (hologram) obtained by imaging by the imaging unit. The image processing unit comprises: an image data obtaining unit configured to obtain, by reconstruction, intensity image data at a predetermined position in a direction of (along) an optical axis with regard to (for) each coordinate position (each coordinate) in the measurement area, based on the interference fringe image with regard to (of) the measurement area obtained by imaging by the imaging unit; a phase information obtaining unit configured to obtain, by reconstruction, phase information of light at the predetermined position in the direction of (along) the optical axis with regard to (for) each coordinate position (each coordinate) in the measurement area, based on the interference fringe image with regard to (of) the measurement area obtained by imaging by the imaging unit; a focusing determination unit configured to determine whether the intensity image data is in a focusing state that satisfies a predetermined condition (for example, the intensity image data has a luminance of not lower than a predetermined reference value), based on the intensity image data at the predetermined position in the direction of (along) the optical axis with regard to (with respect to) a predetermined coordinate position (predetermined coordinate) in the measurement area obtained by the image data obtaining unit; an order specification unit configured to, after determining that the intensity image data at the predetermined position in the direction of (along) the optical axis is in the focusing state with regard to the predetermined coordinate position, based on a result of determination by the focusing determination unit, specify an order corresponding to the predetermined position in the direction of (along) the optical axis, among orders determined (set) at a predetermined measurement range interval in the direction of (along) the optical axis, as an order with regard to (of) the predetermined coordinate position; and a three-dimensional measurement unit configured to perform (execute) three-dimensional measurement (height measurement) with regard to the predetermined coordinate position (predetermined coordinate), based on the phase information with regard to (of) the predetermined coordinate position obtained by the phase information obtaining unit and the order with regard to (of) the predetermined coordinate position specified by the order specification unit.

The "predetermined optical system" includes not only an "optical system that causes the reference light and the measurement light to interfere with each other inside thereof and outputs these two lights as interfering light" but "an optical system that outputs the reference light and the measurement light simply as a combined light without interfering with each other inside thereof." When the "output light" output from the "predetermined optical system" is "combined light", however, the combined light is to be converted into "interfering light" via a predetermined interference element in at least a previous stage prior to imaging by the "imaging unit".

An optical system configured to split a predetermined incident light into two lights, to irradiate a measurement object with one of the two lights as a measurement light and irradiate a reference plane with the other of the two lights as a reference light, recombine the measurement light and the reference light with each other, and emit the recombined light for the purpose of making interference of light (taking interference fringe images) may thus be referred to as an "interference optical system". Accordingly, in Aspect 1 described above (and other aspects described later), the "predetermined optical system (specific optical system)" may be called the "interference optical system".

The configuration of above Aspect 1 using the technique of digital holography allows for height measurement exceeding the measurement range with regard to each of the coordinate positions in the measurement area. This configuration is simplified without requiring any large-scaled moving mechanism such as to move the measurement object and is not affected by the vibration or the like of the moving mechanism, and accordingly achieves the improvement of the measurement accuracy.

Furthermore, the configuration of above Aspect 1 enables all the interference fringe images required for measurement to be obtained by the less number of times of imaging and thereby enhances the measurement efficiency.

Additionally, the configuration of above Aspect 1 is provided with the objective lens for the measurement light, the objective lens for the reference light and the imaging lens configured to form an image of the output light on the imaging unit and thereby further improves the measurement accuracy.

The following describes the functions and the advantageous effects of the characteristics of Aspect 1 provided with the objective lenses and the imaging lens. FIG. 16 is a diagram illustrating an optical relationship between an objective lens and an imaging lens relating to Aspect 1 and schematically illustrates an optical system that causes an image of a measurement object 700 to be formed on an imaging unit 703 via an objective lens 701 and an imaging lens 702.

As shown in this diagram, a procedure of three-dimensional measurement using the technique of digital holography reconstructs intensity image data at a plurality of positions $z_1$ to $z_n$ in a direction of an optical axis J1 (in a direction of a height z) and specifies a reconstructed image at a focusing position $z_p$ where an image is focused in the direction of the optical axis J1 (or at an optimum focusing position $z_p$ where an image is most focused in the direction of the optical axis J1) among a plurality of these intensity image data (reconstructed images).

It is important to detect the luminance of the measurement point as described above in "Description of Related Art", in order to specify a reconstructed image in a focusing state among a plurality of reconstructed images.

The following describes the principle of determining whether a reconstructed image with regard to a pixel at a predetermined position is a reconstructed image at a focusing position (or at an optimum focusing position), based on a luminance of the pixel at the predetermined position in the reconstructed image.

There is no difference in total amount of luminance between a reconstructed image at a focusing position and a reconstructed image at a position other than the focusing position. Even in the case where light is concentrated or blurred in an identical pixel (one pixel at an identical position in an x-y coordinate system), no change in the luminance (total amount of luminance) appears in the pixel.

For example, in the case of imaging a small measurement point PA, it is assumed that the measurement point PA is at the center of a predetermined pixel 800a in a reconstructed image 800 at a focusing position as shown in FIG. 17A. Even in the case where the measurement point PA is blurred to a size of 0.5 pixels in each of the x direction and the y direction (half the length of each side of a pixel 801a) in a reconstructed image 801 at a position shifted from the focusing position by a first predetermined amount in the direction of the optical axis (in the direction of the height z) as shown in FIG. 17B, a deviation from the focusing position is not determinable since there is no change in the luminance (the total amount of luminance) in the pixel 801a including the measurement point PA.

In the case where the measurement point PA is blurred beyond the size of 0.5 pixels in each of the x direction and the y direction (half the length of each side of a pixel 802a) in a reconstructed image 802 at a position shifted from the focusing position by a second predetermined amount in the direction of the optical axis (in the direction of the height z) as shown in FIG. 17C, on the other hand, the luminance (the total amount of luminance) decreases in the pixel 802a including the measurement point PA. A deviation from the focusing position is thus determinable by detecting this change. In other words, the luminance increases in pixels around the pixel 802a including the measurement point PA. A deviation from the focusing position is also determinable by detecting this change.

In another example, in the case of imaging a small measurement point PA, it is assumed that the measurement point PA is over four pixels 800a in a reconstructed image 800 at a focusing position as shown in FIG. 18A. Even in the case where the measurement point PA is blurred to a size of one pixel in each of the x direction and the y direction (the length of each side of a pixel 801a) in a reconstructed image 801 at a position shifted from the focusing position by a first predetermined amount in the direction of the optical axis (in the direction of the height z) as shown in FIG. 18B, a deviation from the focusing position is not determinable since there is no change in the luminance (the total amount of luminance) in each of the four pixels 801a including the measurement point PA.

In the case where the measurement point PA is blurred beyond the size of one pixel in each of the x direction and the y direction (the length of each side of a pixel 802a) in a reconstructed image 802 at a position shifted from the focusing position by a second predetermined amount in the direction of the optical axis (in the direction of the height z) as shown in FIG. 18C, on the other hand, the luminance (the total amount of luminance) decreases in each of the four pixel 802a including the measurement point PA. A deviation from the focusing position is thus determinable by detecting this change. In other words, the luminance increases in pixels around the four pixels 802a including the measurement point PA. A deviation from the focusing position is also determinable by detecting this change.

In the actual state, however, as shown in FIG. 19, in the case where a reconstruction position PS is shifted by a predetermined amount dz from a focusing position PO in the direction of the optical axis (in the direction of the height z), the measurement point PA is blurred to a circular shape having a diameter of 8. An increase in the relative distance dz from the focusing position PO increases the degree of blurring of the measurement point PA (reconstruction state) in a reconstructed image at the reconstruction position PS.

Furthermore, using the object lens 900 and the like as shown in FIG. 19 increases the degree of blurring of the measurement point PA even at an identical reconstruction position PS having an identical relative distance dz from a focusing position PO, compared with a conventional configuration without using the object lens 900 and the like (refer to a portion of two-dot chain line in FIG. 19).

The following describes the functions and the advantageous effects of the present disclosure (Aspect 1) with comparison between luminance values with regard to a predetermined measurement point in a plurality of reconstructed images obtained under a "conventional" configuration without object lenses and the like and luminance values with regard to a predetermined measurement point in a plurality of reconstructed images obtained under the configuration of the "present disclosure (Aspect 1)" with the object lenses and the like.

FIG. 21 is a table illustrating luminance values at a predetermined measurement point in a plurality of reconstructed images that are reconstructed at height positions set at reconstruction intervals of "30 μm" in the direction of the optical axis (in the direction of the height z), more concretely, at height positions of "$3^{rd}$ (+90 μm)", "2nd (+60 μm)", "$1^{st}$ (+30 μm)", "$0^{th}$ (0 μm)", "$-1^{st}$ (−30 μm)", "−2nd (−60 μm)", and "$-3^{rd}$ (−90 μm)", under the "conventional" configuration and under the configuration of the "present disclosure (Aspect 1)".

As shown in FIG. 21, in the "conventional" configuration, the luminance value with regard to the predetermined measurement point in the reconstructed image reconstructed at the height position of "$0^{th}$ (0 μm)" is "128" that is a maximum value. The luminance values with regard to the predetermined measurement point in the reconstructed images reconstructed at the height position of "$1^{st}$ (+30 μm)" and at the height position of "$-1^{st}$ (−30 μm)" are respectively "120". The luminance values with regard to the predetermined measurement point in the reconstructed images reconstructed at the height position of "$2^{nd}$ (+60 μm)" and at the height position of "$-2^{nd}$ (−60 μm)" are respectively "112". The luminance values with regard to the predetermined measurement point in the reconstructed images reconstructed at the height position of "$3^{rd}$ (+90 μm)" and at the height position of "$-3^{rd}$ (−90 μm)" are respectively "104".

Based on these data, in the case illustrated in FIG. 21, the height position of "$0^{th}$ (0 μm)" is specified as the focusing position in the "conventional" configuration.

In the configuration of the "present disclosure", on the other hand, the luminance value with regard to the predetermined measurement point in the reconstructed image reconstructed at the height position of "$0^{th}$ (0 μm)" is "128" that is a maximum value. The luminance values with regard to the predetermined measurement point in the reconstructed images reconstructed at the height position of "$1^{st}$ (+30 μm)" and at the height position of "$-1^{st}$ (−30 μm)" are respectively "100". The luminance values with regard to the predetermined measurement point in the reconstructed images reconstructed at the height position of "$2^{nd}$ (+60 μm)" and at the height position of "$-2^{nd}$ (−60 μm)" are respectively "72". The luminance values with regard to the predetermined measurement point in the reconstructed images reconstructed at the height position of "$3^{rd}$ (+90 μm)" and at the height position of "$-3^{rd}$ (−90 μm)" are respectively "44".

Based on these data, in the case illustrated in FIG. 21, the height position of "$0^{th}$ (0 μm)" is specified as the focusing position in the configuration of the "present disclosure".

In the "conventional" configuration described above, the luminance values with regard to the predetermined measurement point in the reconstructed images reconstructed at the height position of "$\pm1^{st}$ (±30 μm)" are respectively "120", while the peak luminance value with regard to the predetermined measurement point in the reconstructed image reconstructed at the height position of "$0^{th}$ (0 μm)" is "128". A luminance difference from the peak is "8". Similarly, the luminance values with regard to the predetermined measurement point in the reconstructed images reconstructed at the height position of "$\pm2^{nd}$ (±60 μm)" are respectively "112", and a luminance difference from the peak is "16". The luminance values with regard to the predetermined measurement point in the reconstructed images reconstructed at the height position of "$\pm3^{rd}$ (±90 μm)" are respectively "104", and a luminance difference from the peak is "24".

In the configuration of the "present disclosure", on the other hand, the luminance values with regard to the predetermined measurement point in the reconstructed images reconstructed at the height position of "$1^{st}$ (±30 μm)" are respectively "100", while the peak luminance value with regard to the predetermined measurement point in the reconstructed image reconstructed at the height position of "$0^{th}$ (0 μm)" is "128". A luminance difference from the peak is "28". Similarly, the luminance values with regard to the predetermined measurement point in the reconstructed images reconstructed at the height position of "$\pm2^{nd}$ (±60 μm)" are respectively "72", and a luminance difference from the peak is "56". The luminance values with regard to the predetermined measurement point in the reconstructed images reconstructed at the height position of "$\pm3^{rd}$ (±90 μm)" are respectively "44", and a luminance difference from the peak is "84".

The configuration of the "present disclosure (Aspect 1)" using the objective lenses and the like has a greater change in the luminance value of the measurement point at the reconstruction position having the identical relative distance (reconstruction distance) from the focusing position, compared with the "conventional" configuration without using the objective lenses and the like. This makes it easier to specify the focusing position and is less likely to be affected by the noise and the like. As a result, this configuration improves the measurement accuracy.

Aspect 2. There is provided a three-dimensional measurement device, comprising: a predetermined optical system (a specific optical system) configured to split a predetermined light entering therein into two lights, to irradiate a measurement object (for example, a wafer substrate) with one of the two lights as a measurement light and irradiate a reference plane with the other of the two lights as a reference light, and to combine the measurement light and the reference light with each other and emit a combined light; an irradiation unit (or irradiator) configured to emit the predetermined light that enters the predetermined optical system; an imaging unit (or imaging device) configured to take an image of an output light (combined light) emitted from the predetermined optical system and obtains an interference fringe image; an objective lens for the measurement light configured to direct and radiate the measurement light toward the measurement object; an objective lens for the reference light configured to direct and radiate the reference light toward the reference plane; an imaging lens configured to form an image of the output light (combined light) onto the imaging unit (an imaging element of the imaging unit); and an image processing unit (or control device) configured to perform (execute) three-dimensional measurement with regard to (of) a predetermined measurement area of (on) the measurement object (the entirety or part of the measurement object), based on the interference fringe image (hologram) obtained by imaging by the imaging unit. The image processing unit comprises: an image data obtaining unit configured to obtain, by reconstruction, a plurality of (pieces of) intensity image data at a predetermined interval at least within a predetermined range in a direction of (along) an optical axis, each (piece of) intensity image data being at a predetermined position in the direction of (along) the optical axis with regard to (for) each coordinate position (each coordinate) in the measurement area, based on the interference fringe image with regard to (of) the measurement area obtained by imaging by the imaging unit; a focusing position determination unit configured to determine a predetermined focusing position in the direction of (along) the optical axis (for example, a position in the direction of the optical axis where most-focused intensity image data is obtained) with regard to (for) a predetermined coordinate position (predetermined coordinate) in the measurement area, based on the plurality of intensity image data with regard to (with respect to) the predetermined coordinate position (predetermined coordinate) in the measurement area obtained by the image data obtaining unit; an order specification unit configured to specify an order corresponding to the focusing position in the direction of (along) the optical axis with regard to (for) the predetermined coordinate position (predetermined coordinate) determined by the focusing position determination unit, among orders determined (set) at a predetermined measurement range interval in the direction of (along) the optical axis, as an order with regard to (of) the predetermined coordinate position (predetermined coordinate); a phase information obtaining unit configured to obtain, by reconstruction, phase information of light at the predetermined position in the direction of (along) the optical axis with regard to (for) each coordinate position (each coordinate) in the measurement area, based on the interference fringe image with regard to (of) the measurement area obtained by imaging by the imaging unit; and a three-dimensional measurement unit configured to perform (execute) three-dimensional measurement (height measurement) with regard to the predetermined coordinate position, based on the phase information with regard to (of) the predetermined coordinate position (predetermined coordinate) obtained by the phase information obtaining unit and the order with regard to (of) the predetermined coordinate position specified by the order specification unit.

The configuration of above Aspect 2 has similar functions and advantageous effects to those of Aspect 1 described above.

Aspect 3. There is provided a three-dimensional measurement device, comprising: a predetermined optical system (a specific optical system) configured to split a predetermined light entering therein into two lights, to irradiate a measurement object (for example, a wafer substrate) with one of the two lights as a measurement light and irradiate a reference plane with the other of the two lights as a reference light, and to combine the measurement light and the reference light with each other and emit a combined light; an irradiation unit (or irradiator) configured to emit the predetermined light that enters the predetermined optical system; an imaging unit (or imaging device) configured to take an image of an output light (combined light) emitted from the predetermined optical system and obtains an interference fringe image; an objective lens for the measurement light configured to direct and radiate the measurement light toward the measurement object; an objective lens for the reference light configured to direct and radiate the reference light toward the reference plane; an imaging lens configured to form an image of the output light (combined light) onto the imaging unit (an imaging element); and an image processing unit (or control device) configured to perform (execute) three-dimensional measurement with regard to (of) a predetermined measurement area of (on) the measurement object (the entirety or part of the measurement object), based on the interference fringe image (hologram) obtained by imaging by the imaging unit. The image processing unit comprises: a first image data obtaining unit configured to obtain, by reconstruction, a plurality of (pieces of) intensity image data at a predetermined interval at least within a first range in a direction of (along) an optical axis, each (piece of) intensity image data being at a predetermined position in the direction of (along) the optical axis with regard to (within) a specific area that is a part set in advance in the measurement area, based on the interference fringe image obtained by imaging by the imaging unit; a first focusing position determination unit configured to determine a predetermined (first) focusing position in the direction of (along) the optical axis with regard to (within) the specific area, based on the plurality of intensity image data with regard to (with respect to) the specific area obtained by the first image data obtaining unit; a second image data obtaining unit configured to obtain, by reconstruction, a plurality of (pieces of) intensity image data at a predetermined interval at least within a second range in the direction of (along) the optical axis, which is set on a basis of the focusing position in the direction of the optical axis with regard to the specific area, each piece of intensity image data being at a predetermined position in the direction of (along) the optical axis with regard to (for) each coordinate position (each coordinate) in the measurement area, based on the interference fringe image with regard to (of) the measurement area obtained by imaging by the imaging unit; a second focusing position determination unit configured to determine a predetermined (second) focusing position in the direction of (along) the optical axis with regard to (for) a predetermined coordinate position (predetermined coordinate) in the measurement area, based on the plurality of intensity image data with regard to the predetermined coordinate position in the measurement area obtained by the second image data obtaining unit; an order specification unit configured to specify an order corresponding to the focusing position in the direction of the optical axis with regard to the predetermined coordinate position determined by the second focusing position determination unit, among orders determined (set) at a predetermined measurement range interval in the direction of (along) the optical axis, as an order with regard to (of) the predetermined coordinate position; a phase information obtaining unit configured to obtain, by reconstruction, phase information of light at the predetermined position in the direction of (along) the optical axis with regard to (for) each coordinate position (each coordinate) in the measurement area, based on the interference fringe image with regard to the measurement area obtained by imaging by the imaging unit; and a three-dimensional measurement unit configured to perform (execute) three-dimensional measurement (height measurement) with regard to the predetermined coordinate position (predetermined coordinate), based on the phase information with regard to (of) the predetermined coordinate position obtained by the phase information obtaining unit and the order with regard to (of) the predetermined coordinate position specified by the order specification unit.

The configuration of above Aspect 3 has similar functions and advantageous effects to those of Aspect 1 and Aspect 2 described above. Especially, the configuration of this aspect first obtains the intensity image data at a plurality of positions in the direction of the optical axis not with regard to the entire measurement area but with regard to the specific area (a limited narrow range) that is a part set in advance in the measurement area, and specifies the position of the measurement object in the direction of the optical axis, based on the focusing state of the intensity image data.

The configuration of this aspect subsequently obtains intensity image data at a plurality of positions in the direction of the optical axis, with regard to each of the coordinate positions in the entire measurement area, on the basis of the focusing position with regard to the specific area.

This configuration reduces the load of the process of obtaining data required for three-dimensional measurement with regard to the measurement area and shortens the time period required for this process. As a result, the configuration of this aspect improves the measurement accuracy and enhances the measurement efficiency.

Aspect 4. In the three-dimensional measurement device described in any of Aspects 1 to 3 described above, the objective lens may have a numerical aperture NA that satisfies an expression given below:

$$NA > a/\sqrt{((dz)^2 + a^2)}$$

where a denotes a pixel size and dz denotes a reconstruction interval.

In the case of using the objective lens having a relatively small numerical aperture NA, even a relatively large reconstruction interval dz (relative distance from the focusing position) is likely to reduce the degree of blurring of a measurement point and makes it difficult to specify the focusing position.

In the case of using the objective lens having a relatively large numerical aperture NA like the objective lens of Aspect 4 described above, on the other hand, reflected light that is reflected in a wide range from a curved portion of the measurement object, such as a top portion of a bump, is more readily received by the objective lens. Even a small reconstruction interval dz is likely to increase the degree of blurring of the measurement point and makes it easier to specify the focusing position. As a result, the configuration of above Aspect 4 further enhances the functions and the advantageous effects of Aspect 1 and the like described above.

The following describes the functions and the advantageous effects of the characteristics of Aspect 4. For example, when a semispherical bump 101 is a measurement object (a measurement target) as shown in FIG. 20, irradiated light K1 which the periphery of a top of the bump 101 is irradiated with has reflected light K2 that is diffused. In this state, an objective lens 901 having a large numerical aperture NA can receive the reflected light K2 from the bump 101 in a wider range, compared with an objective lens 902 having a small numerical aperture NA (refer to a portion of a two-dot chain line in FIG. 20).

Accordingly, a measurable range G1 by using the objective lens 901 having the large numerical aperture NA is larger than a measurable range G2 by using the objective lens 902 having the small numerical aperture NA.

As described above, in order to reliably detect whether there is a deviation from the focusing position, as shown in FIGS. 17A and 17C and FIGS. 18A and 18C, the blurring of a predetermined measurement point PA is required to be larger than a size of at least two pixels as a whole.

More concretely, it is required to satisfy a relationship of Expression (1) given below, in order to make the blurring of the measurement point PA larger than the size of two pixels. In other words, a diameter 8 of a circle formed by blurring of the measurement point PA is required to be larger than double a pixel size a (as shown in FIG. 19):

$$\varepsilon > 2a \qquad (1)$$

As shown in FIG. 19, the numerical aperture NA is expressed by Expression (2) given below, where θ denotes a maximum angle of a light beam entering an objective lens 900 from the measurement point PA, to an optical axis J1, and n denotes a refractive index of a medium between the measurement point PA and the objective lens 900 (n is approximately equal to 1 in the air):

$$NA = n \times \sin \theta \qquad (2)$$

A relationship of Expression (3) given below is established, where dz denotes a reconstruction interval (a relative distance from the focusing position) (as shown in FIG. 19):

$$\varepsilon = 2 \times dz \times \tan \theta \qquad (3)$$

Expression (4) given below is led from Expression (1) and Expression (3) given above:

$$2 \times dz \times \tan \theta > 2a \qquad (4)$$

Since $\tan \theta = \sin \theta/(1-\sin^2 \theta)$, Expression (5) given below is led from Expression (4) given above:

$$2 \times dz \times \{\sin \theta/(\sqrt{1-\sin^2 \theta})\} > 2a \qquad (5)$$

Expression (6) given below is obtained by substituting Expression (2) given above where the refractive index n=1 into Expression (5) given above:

$$2 \times dz \times \{(NA)/\sqrt{(1-(NA)^2}\} > 2a \qquad (6)$$

Expression (7) given below is obtained by dissolving Expression (6) given above with respect to the numerical aperture NA:

$$NA > a/\sqrt{((dz)^2 + a^2)} \qquad (7)$$

In one or more embodiments, the reconstruction intervals dz is not less than 0 and does not exceed the measurement range interval R (0≤dz≤R). The measurement range R is a measurement range of the three-dimensional measurement device. For example, in the case of measurement by using only one light of one wavelength, a measurement range determined according to the wavelength corresponds to the measurement range R. In the case of measurement by using two lights of two different wavelengths, a measurement range determined according to a composite wavelength of the two wavelengths corresponds to the measurement range R.

The numerical aperture NA may be larger as long as possible in one or more embodiments. Unless a special technique such as liquid immersion is employed, however, the upper limit of the numerical aperture NA is equal to 1 (refer to Expression (2) given above in the case of a refractive index n=1). Accordingly, the numerical aperture NA is not greater than 1 (NA≤1) in one or more embodiments.

Aspect 5. In the three-dimensional measurement device described in any of Aspects 1 to 4 described above, the irradiation unit may comprise a first irradiation unit (or first light emitter) configured to emit a first light that includes a polarized light of a first wavelength and that enters the predetermined optical system; a second irradiation unit (or second light emitter) configured to emit a second light that includes a polarized light of a second wavelength and that enters the predetermined optical system; a projection lens for the first light placed between the predetermined optical system and the first irradiation unit and configured to collect the first light directed onto the objective lens; and a projection lens for the second light placed between the predetermined optical system and the second irradiation unit and configured to collect the second light directed onto the objective lens. The imaging unit may include a first imaging unit (or first imaging device) configured to take an image of an output light (combined light) with regard to the first light that is emitted from the predetermined optical system once the first light enters the predetermined optical system; and a second imaging unit (or second imaging device) configured to take an image of an output light (combined light) with regard to the second light that is emitted from the predetermined optical system once the second light enters the predetermined optical system. The imaging lens may include an imaging lens for first imaging configured to form an image of the output light (combined light) with regard to (of) the first light on the first imaging unit; and an imaging lens for second imaging configured to form an image of the output light (combined light) with regard to (of) the second light on the second imaging unit.

The "first light" emitted from the "first irradiation unit" is a light including at least the "polarized light (first polarized light) of the first wavelength" and may be a light including another extra component that is subsequently to be cut in the "predetermined optical system" (for example, a "non-polarized light" or a "circularly polarized light").

Similarly, the "second light" emitted from the "second irradiation unit" is a light including at least the "polarized light (second polarized light) of the second wavelength" and may be a light including another extra component that is subsequently to be cut in the "predetermined optical system" (for example, a "non-polarized light" or a "circularly polarized light").

The "output light with regard to the first light" output from the "predetermined optical system (the specific optical system) includes a "combined light of the reference light and the measurement light with regard to the first light or an interference light obtained by interfering the combined light". The "output light with regard to the second light" includes a "combined light of the reference light and the measurement light with regard to the second light or an interference light obtained by interfering the combined light".

The configuration of above Aspect 5 uses two lights of different wavelengths to expand the measurement range and is provided with the two imaging units to enhance the measurement efficiency.

In the configuration including the objective lenses like above Aspect 1 or the like, the light radiated to the measurement object is gathered at one point (a narrow range) in the measurement range. This is likely to narrow the measurement area that is measurable by one measurement.

The configuration including the projection lens to cause the light emitted from the irradiation unit to be directed to and collected by the objective lens like above Aspect 5, on the other hand, enables a wider range of the measurement object to be irradiated with uniform parallel light. As a result, this configuration enables a wider range to be measured by one measurement.

Aspect 6: In the three-dimensional measurement device described in any of Aspects 1 to 5 described above, the measurement object may be a wafer substrate with a bump formed thereon.

The configuration of above Aspect 6 allows for measurement of the bump formed on the wafer substrate. This accordingly enables an inspection of the bump to be performed to determine the good/poor quality of the bump, based on a measurement value thereof. The functions and the advantageous effects of the respective aspects described above are applied to this inspection of the bump and allows for the good/poor quality judgment with the high accuracy. As a result, this improves the inspection accuracy and enhances the inspection efficiency in a bump inspection device.

BRIEF DESCRIPTION OF DRAWINGS

FIG. 5 is a flowchart showing the flow of a measurement process;

FIG. 6 is an explanatory diagram illustrating a positional relationship between a work and an imaging element and the like;

FIG. 7 is an explanatory diagram illustrating a positional relationship between the work and the imaging element and the like;

FIG. 11 is a diagram illustrating a relationship between a measurement range, a phase, an order, height measurement values and the like by one concrete example;

FIG. 12 is a diagram illustrating a relationship between the measurement range, the phase, the order, the height measurement values and the like according to another example of one or more embodiments;

FIG. 19 is a schematic diagram illustrating a correspondence relationship between a focusing position of a measurement point, a relative distance between the focusing position and a reconstruction position; a degree of blurring of the measurement point at the reconstruction position (reconstruction state), an angle of incident light from the measurement point to an objective lens and the like;

FIG. 21 is a table illustrating luminance values with regard to a predetermined measurement point in a plurality of reconstructed images reconstructed at a plurality of height positions under a conventional configuration and a configuration of the present disclosure.

DETAILED DESCRIPTION OF EMBODIMENTS

The following describes embodiments of the three-dimensional measurement device with reference to drawings. The three-dimensional measurement device of one or more embodiments is a measurement device configured to perform three-dimensional measurement by using digital holography. The "digital holography" herein means a technique of obtaining an interference fringe image (hologram) and reconstructing an image from the obtained hologram.

Figure 1:
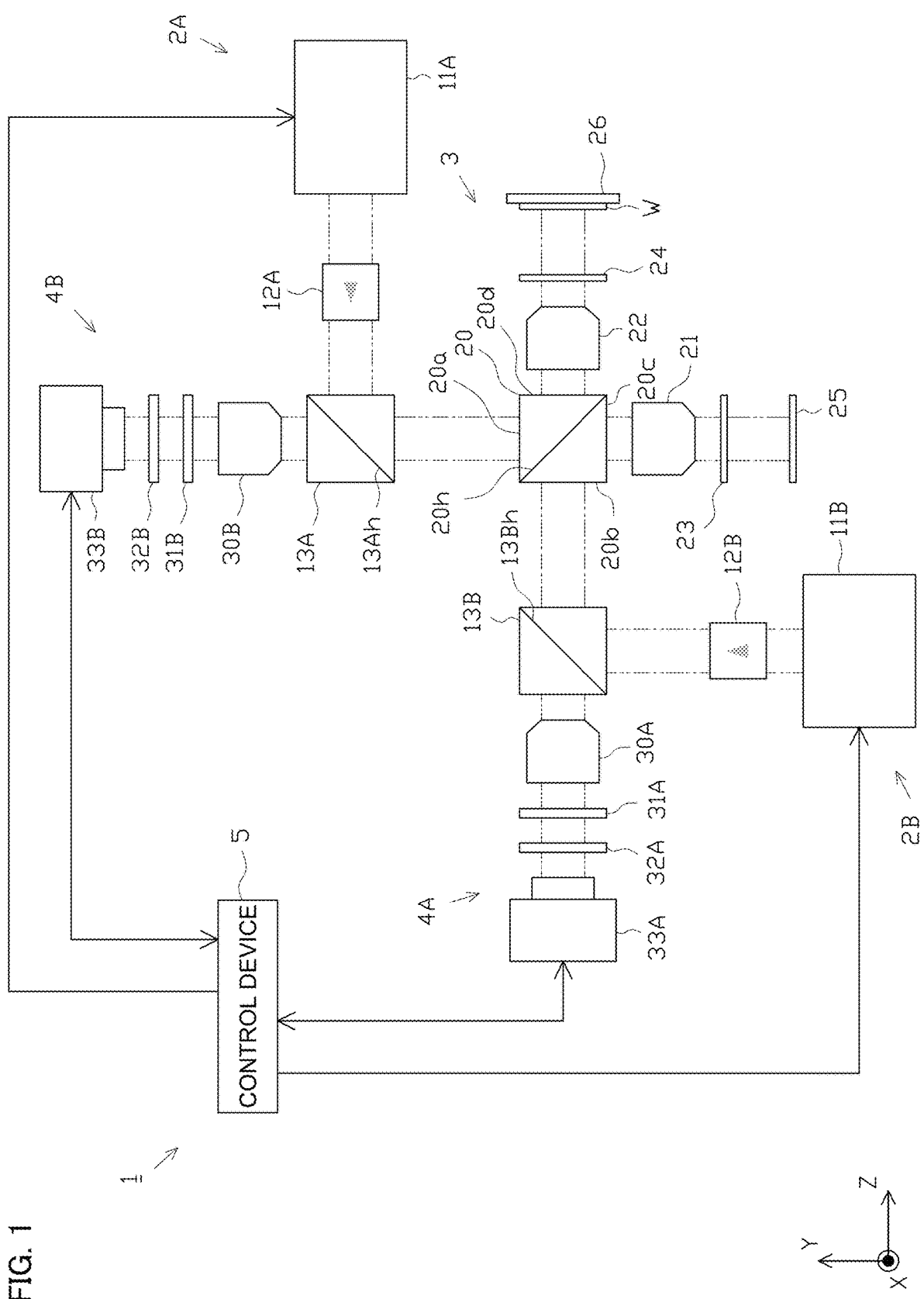
FIG. 1 is a schematic configuration diagram illustrating a three-dimensional measurement device.
Figure 2:
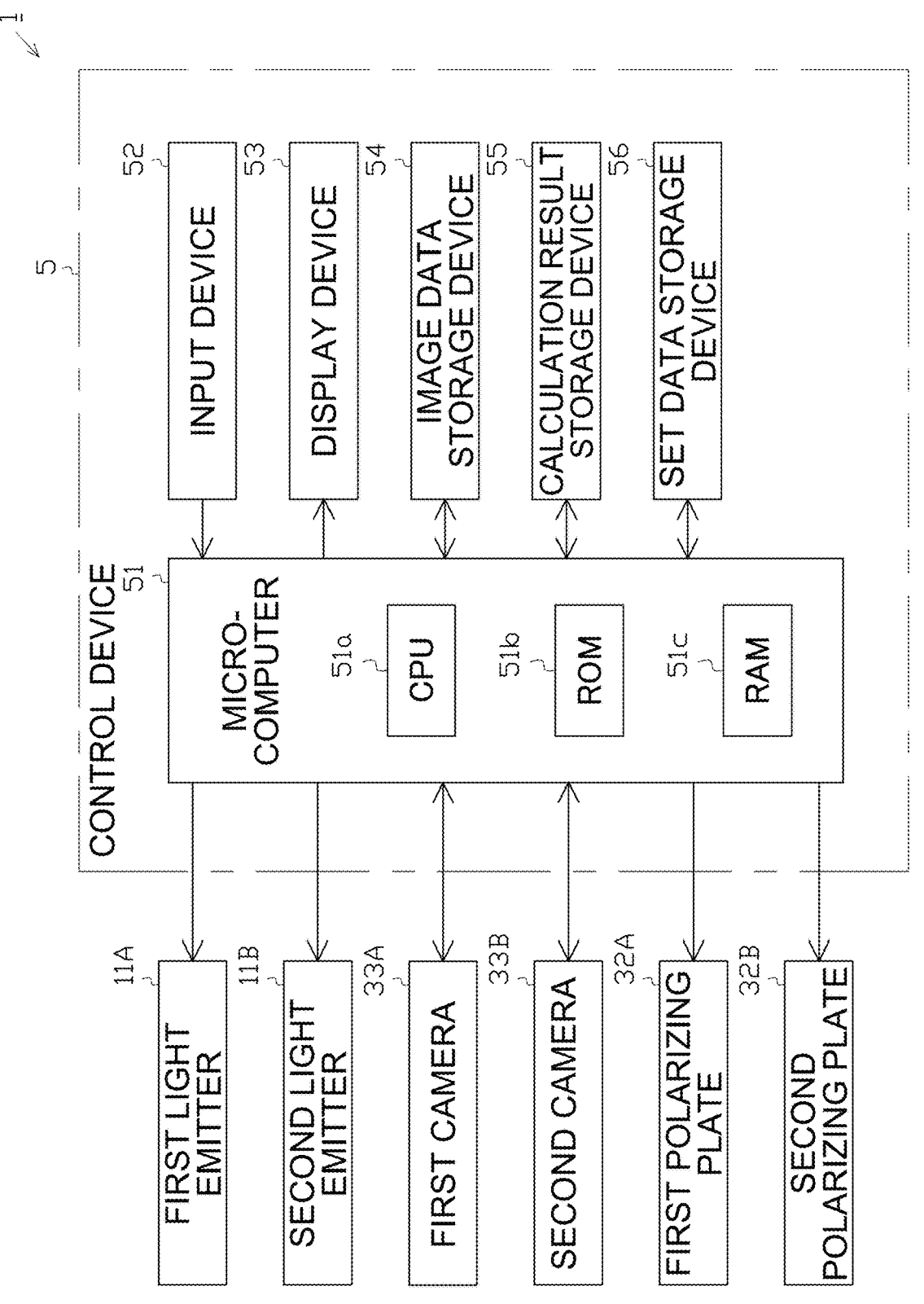
FIG. 2 is a block diagram illustrating the electrical configuration of the three-dimensional measurement device.

FIG. 1 is a schematic diagram illustrating the general configuration of a three-dimensional measurement device 1 according to one or more embodiments. FIG. 2 is a block diagram illustrating the electrical configuration of the three-dimensional measurement device 1. In the description below, for the purpose of convenience, a front-back direction on a sheet surface of FIG. 1 is called an "X-axis direction", a vertical direction on the sheet surface is called a "Y-axis direction", and a horizontal direction on the sheet surface is called a "Z-axis direction".

The three-dimensional measurement device 1 is configured on the principle of Michelson interferometer and includes two projection optical systems 2A and 2B (first projection optical system 2A and second projection optical system 2B) serving as irradiation units configured to output lights of specific wavelengths; an interference optical system 3 configured to receive incident lights respectively emitted from the projection optical systems 2A and 2B; two imaging systems 4A and 4B (first imaging system 4A and second imaging system 4B) serving as imaging units configured to take images of the light emitted from the interference optical system 3; and a control device 5 configured to perform various controls, image processing, arithmetic operations, and the like relating to, for example, the projection optical systems 2A and 2B, the interference optical system 3 and the imaging systems 4A and 4B.

The "control device 5" configures the "image processing unit" according to one or more embodiments, and the "interference optical system 3" configures the "predetermined optical system (specific optical system" according to one or more embodiments. In the description of one or more embodiments, an optical system that splits predetermined incident light into two split lights (measurement light and reference light), makes an optical path difference between the two split lights, recombines the split lights, and outputs the recombined light for the purpose of causing interference of light (taking an interference fringe image) is called the "interference optical system". More specifically, not only an optical system that causes two lights to interfere with each other inside thereof and outputs these two lights as interfering light but an optical system that outputs two lights as combined light without interfering with each other inside thereof is called the "interference optical system". As described later in one or more embodiments, in the case where two lights (measurement light and reference light) are output as combined light from the "interference optical system" without interfering with each other, interfering light is obtained via a predetermined interference unit at least in a previous stage prior to imaging (for example, inside of the imaging system).

The following first describes the configuration of the two projection optical systems 2A and 2B (the first projection optical system 2A and the second projection optical system 2B) in detail. The first projection optical system 2A includes, for example, a first light emitter 11A, a first light isolator 12A and a first non-polarizing beam splitter 13A. The "first light emitter 11A" configures the "first irradiation unit" according to one or more embodiments.

The first light emitter 11A includes, for example, a laser light source configured to output linearly polarized light having a specific wavelength $\lambda_1$, a beam expander configured to expand the linearly polarized light output from the laser light source and output the expanded linearly polarized light as parallel light, a polarizing plate configured to adjust the intensity, and a half-wave plate configured to adjust the polarizing direction.

According to one or more embodiments under the above configuration, linearly polarized light that is polarized in a direction inclined at an angle of 45 degrees to the X-axis direction and the Y-axis direction as a polarizing direction and that has a wavelength $\lambda_1$ (for example, $\lambda_1=1500$ nm) is emitted leftward in the Z-axis direction from the first light emitter 11A. The "wavelength $\lambda_1$" corresponds to the "first wavelength" according to one or more embodiments. In the description below, the light that is emitted from the first light emitter 11A and that has the wavelength $\lambda_1$ is called "first light".

The first light isolator 12A is an optical element that causes only light traveling in one direction (leftward in the Z-axis direction according to one or more embodiments) to be transmitted, while blocking light traveling in an opposite direction (rightward in the Z-axis direction according to one or more embodiments). This configuration allows for transmission of only the first light emitted from the first light emitter 11A and prevents the first light emitter 11A from being damaged, destabilized or the like by return light.

The first non-polarizing beam splitter 13A is a known cube-shaped optical member obtained by joining right-angle prisms (triangular prisms respectively having isosceles right triangular bottom faces: The same applies to the description hereafter) with each other to be integrated, and has a joint surface 13Ah coated with, for example, a metal film. The "first non-polarizing beam splitter 13A" configures the "first light guiding unit" according to one or more embodiments.

The non-polarizing beam splitter serves to split incident light including a polarization state thereof into transmitted light and reflected light at a predetermined ratio. The same applies to the description hereafter. According to one or more embodiments, a so-called half mirror having a split ratio of 1:1 is employed. The non-polarizing beam splitter accordingly splits the incident light into a P-polarized light component and an S-polarized light component of transmitted light and a P-polarized light component and an S-polarized light component of reflected light all at identical rates, with keeping the respective polarization states of the transmitted light and the reflected light identical with the polarization state of the incident light.

In one or more embodiments, linearly polarized light that is polarized in a direction parallel to the sheet surface of FIG. 1 (the Y-axis direction or the Z-axis direction) as the polarizing direction is called P-polarized light (P-polarized light component), and linearly polarized light that is polarized in the X-axis direction perpendicular to the sheet surface of FIG. 1 as the polarizing direction is called S-polarized light (S-polarized light component).

The first non-polarizing beam splitter 13A is arranged such that one of two adjacent faces across the joint surface 13Ah thereof is perpendicular to the Y-axis direction and the other of the two adjacent faces is perpendicular to the Z-axis direction. In other words, the joint surface 13Ah of the first non-polarizing beam splitter 13A is arranged to be inclined at an angle of 45 degrees to the Y-axis direction and the Z-axis direction. More specifically, the first non-polarizing beam splitter 13A is arranged such as to cause part (half) of the first light entering leftward in the Z-axis direction from the first light emitter 11A via the first light isolator 12A to be transmitted leftward in the Z-axis direction and such as to cause the remaining part (the remaining half) of the first light to be reflected downward in the Y-axis direction.

Like the first projection optical system 2A described above, the second projection optical system 2B includes, for example, a second light emitter 11B, a second light isolator 12B and a second non-polarizing beam splitter 13B. The "second light emitter 11B" configures the "second irradiation unit" according to one or more embodiments.

Like the first light emitter 11A described above, the second light emitter 11B includes, for example, a laser light source configured to output linearly polarized light having a specific wavelength $\lambda_2$, a beam expander configured to expand the linearly polarized light output from the laser light source and output the expanded linearly polarized light as parallel light, a polarizing plate configured to adjust the intensity, and a half-wave plate configured to adjust the polarizing direction.

According to one or more embodiments under the above configuration, linearly polarized light that is polarized in a direction inclined at an angle of 45 degrees to the X-axis direction and the Z-axis direction as the polarizing direction and that has a wavelength $\lambda_2$ (for example, $\lambda_2=1503$ nm) is emitted upward in the Y-axis direction from the second light emitter 11B. The "wavelength $\lambda_2$" corresponds to the "second wavelength" according to one or more embodiments. In the description below, the light that is emitted from the second light emitter 11B and that has the wavelength $\lambda_2$ is called "second light".

Like the first light isolator 12A, the second light isolator 12B is an optical element that causes only light traveling in one direction (upward in the Y-axis direction according to one or more embodiments) to be transmitted, while blocking light traveling in an opposite direction (downward in the Y-axis direction according to one or more embodiments). This configuration allows for transmission of only the second light emitted from the second light emitter 11B and prevents the second light emitter 11B from being damaged, destabilized or the like by return light.

Like the first non-polarizing beam splitter 13A, the second non-polarizing beam splitter 13B is a known cube-shaped optical member obtained by joining right-angle prisms with each other to be integrated, and has a joint surface 13Bh coated with, for example, a metal film. The "second non-polarizing beam splitter 13B" configures the "second light guiding unit" according to one or more embodiments.

The second non-polarizing beam splitter 13B is arranged such that one of two adjacent faces across the joint surface 13Bh thereof is perpendicular to the Y-axis direction and the other of the two adjacent faces is perpendicular to the Z-axis direction. In other words, the joint surface 13Bh of the second non-polarizing beam splitter 13B is arranged to be inclined at an angle of 45 degrees to the Y-axis direction and the Z-axis direction. More specifically, the second non-polarizing beam splitter 13B is arranged such as to cause part (half) of the second light entering upward in the Y-axis direction from the second light emitter 11B via the second light isolator 12B to be transmitted upward in the Y-axis direction and such as to cause the remaining part (the remaining half) of the second light to be reflected rightward in the Z-axis direction.

The following describes the configuration of the interference optical system 3 in detail. The interference optical system 3 includes, for example, a polarizing beam splitter (PBS) 20, objective lenses 21 and 22, quarter-wave plates 23 and 24, a reference plane 25 and a mounting portion 26.

The polarizing beam splitter 20 is a known cube-shaped optical member obtained by joining right-angle prisms with each other to be integrated, and has a joint surface (boundary face) 20h coated with, for example, a dielectric multi-layer film.

The polarizing beam splitter 20 serves to split linearly polarized incident light into two polarized light components (P-polarized light component and S-polarized light component) that have polarizing directions perpendicular to each other. The polarizing beam splitter 20 according to one or more embodiments is configured to cause the P-polarized light component to be transmitted and to cause the S-polarized light component to be reflected.

The polarizing beam splitter 20 is arranged such that one of two adjacent faces across the joint surface 20h thereof is perpendicular to the Y-axis direction and the other of the two adjacent faces is perpendicular to the Z-axis direction. In other words, the joint surface 20h of the polarizing beam splitter 20 is arranged to be inclined at an angle of 45 degrees to the Y-axis direction and the Z-axis direction.

More specifically, the polarizing beam splitter 20 is arranged such that a first face (Y-axis direction upper face) 20a of the polarizing beam splitter 20 which causes the first light reflected downward in the Y-axis direction to enter from the first non-polarizing beam splitter 13A described above and a third face (Y-axis direction lower face) 20c opposed to the first face 20a are perpendicular to the Y-axis direction. The "first face 20a of the polarizing beam splitter 20" corresponds to the "first input-output portion" according to one or more embodiments.

The polarizing beam splitter 20 is, on the other hand, arranged such that a second face (Z-axis direction left side face) 20b of the polarizing beam splitter 20 which causes the second light reflected rightward in the Z-axis direction to enter from the second non-polarizing beam splitter 13B described above and a fourth face (Z-axis direction right side face) 20d opposed to the second face 20b are perpendicular to the Z-axis direction. The "second face 20b of the polarizing beam splitter 20" corresponds to the "second input-output portion" according to one or more embodiments.

The objective lens 21 is arranged to be opposed in the Y-axis direction to the third face 20c of the polarizing beam splitter 20. The quarter-wave plate 23 is arranged to be opposed in the Y-axis direction to the objective lens 21. The reference plane 25 is arranged to be opposed in the Y-axis direction to the quarter-wave plate 23.

The objective lens 21 is arranged such that a focal position on one side is positioned on the reference plane 25 and that focal positions on the other sides (first imaging system 4A-side and second imaging system 4B-side) respectively overlap with a focal position on the other side (interference optical system 3-side) of an imaging lens 30A described later and with a focal position on the other side (interference optical system 3-side) of an imaging lens 30B described later.

The objective lens 21 accordingly serves to cause light (reference light) emitted from the third face 20c of the polarizing beam splitter 20 to be directed toward the reference plane 25, such as to irradiate the reference plane 25. The objective lens 21 may be configured by a lens unit consisting of a plurality of lenses or may be configured by a single lens.

The quarter-wave plate 23 serves to convert linearly polarized light into circularly polarized light and to convert circularly polarized light into linearly polarized light. Accordingly, the linearly polarized light (reference light) that is emitted from the third face 20c of the polarizing beam splitter 20 and that passes through the objective lens 21 is converted into circularly polarized light via the quarter-wave plate 23 to irradiate the reference plane 25. The reference light reflected from the reference plane 25 is converted again from the circularly polarized light into linearly polarized light via the quarter-wave plate 23, passes through the objective lens 21 and enters the third face 20c of the polarizing beam splitter 20.

The objective lens 22 is, on the other hand, arranged to be opposed in the Z-axis direction to the fourth face 20d of the polarizing beam splitter 20. The quarter-wave plate 24 is arranged to be opposed in the Z-axis direction to the objective lens 22. The mounting portion 26 is arranged to be opposed in the Z-axis direction to the quarter-wave plate 24.

The objective lens 22 is arranged such that a focal position on one side is positioned on the mounting portion 26 and that focal positions on the other sides (first imaging system 4A-side and second imaging system 4B-side) respectively overlap with the focal position on the other side (the interference optical system 3-side) of the imaging lens 30A described later and with the focal position on the other side (the interference optical system 3-side) of the imaging lens 30B described later.

The objective lens 22 accordingly serves to cause light (measurement light) emitted from the fourth face 20d of the polarizing beam splitter 20 to be directed toward a work W that is an object to be measured or a measurement object placed on the mounting portion 26, such as to irradiate the work W. The objective lens 22 may be configured by a lens unit consisting of a plurality of lenses or may be configured by a single lens.

The quarter-wave plate 24 serves to convert linearly polarized light into circularly polarized light and to convert circularly polarized light into linearly polarized light. Accordingly, the linearly polarized light (measurement light) that is emitted from the fourth face 20d of the polarizing beam splitter 20 and that passes through the objective lens 22 is converted into circularly polarized light via the quarter-wave plate 24 to irradiate the work W that is the object to be measured or the measurement object placed on the mounting portion 26. The measurement light reflected from the work W is converted again from the circularly polarized light into linearly polarized light via the quarter-wave plate 24, passes through the objective lens 22 and enters the fourth face 20d of the polarizing beam splitter 20.

The following describes the configuration of the two imaging systems 4A and 4B (the first imaging system 4A and the second imaging system 4B) in detail. The first imaging system 4A includes, for example, an imaging lens 30A, a quarter-wave plate 31A, a first polarizing plate 32A and a first camera 33A configuring the first imaging unit.

The imaging lens 30A is arranged such that a focal position on one side (first camera 33A-side) is positioned at an imaging element 33Aa described later and that a focal position on the other side (interference optical system 3-side) overlaps with a focal position on the first imaging system 4A-side of the objective lens 21 for the reference light and with a focal position on the first imaging system 4A-side of the objective lens 22 for the measurement light.

The imaging lens 30A accordingly serves to cause linearly polarized light (a reference light component and a measurement light component of the first light) emitted from the second face 20b of the polarizing beam splitter 20 and transmitted leftward in the Z-axis direction through the second non-polarizing beam splitter 13B to be imaged on the first camera 33A (on the imaging element 33Aa). The imaging lens 30A may be configured by a lens unit consisting of a plurality of lenses or may be configured by one single lens.

The quarter-wave plate 31A is configured to convert each linearly polarized light (the reference light component and the measurement light component of the first light) that is transmitted leftward in the Z-axis direction through the second non-polarizing beam splitter 13B and that passes through the imaging lens 30A, into circularly polarized light.

The first polarizing plate 32A serves to cause each component of the first light converted into circularly polarized light by the quarter-wave plate 31A to be selectively transmitted therethrough. This configuration enables the reference light component and the measurement light component of the first light having different rotating directions to interfere with each other with respect to a specific phase. The "first polarizing plate 32A" configures the "phase shift unit" and the "interference unit" according to one or more embodiments.

The first polarizing plate 32A according to one or more embodiments is configured to be rotatable about the Z-axis direction as the axial center and is controlled to change a direction of a transmission axis by every 45 degrees. More specifically, the direction of the transmission axis is changed to "0 degree", "45 degrees", "90 degrees", and "135 degrees" to the Y-axis direction.

This configuration enables the reference light component and the measurement light component of the first light transmitted through the first polarizing plate 32A to interfere with each other with respect to four different phases. This accordingly generates interference lights having different phases by 90 degrees each or more specifically generates an interference light having a phase of "0 degree", an interference light having a phase of "90 degrees", an interference light having a phase of "180 degrees", and an interference light having a phase of "270 degrees".

Figure 6:
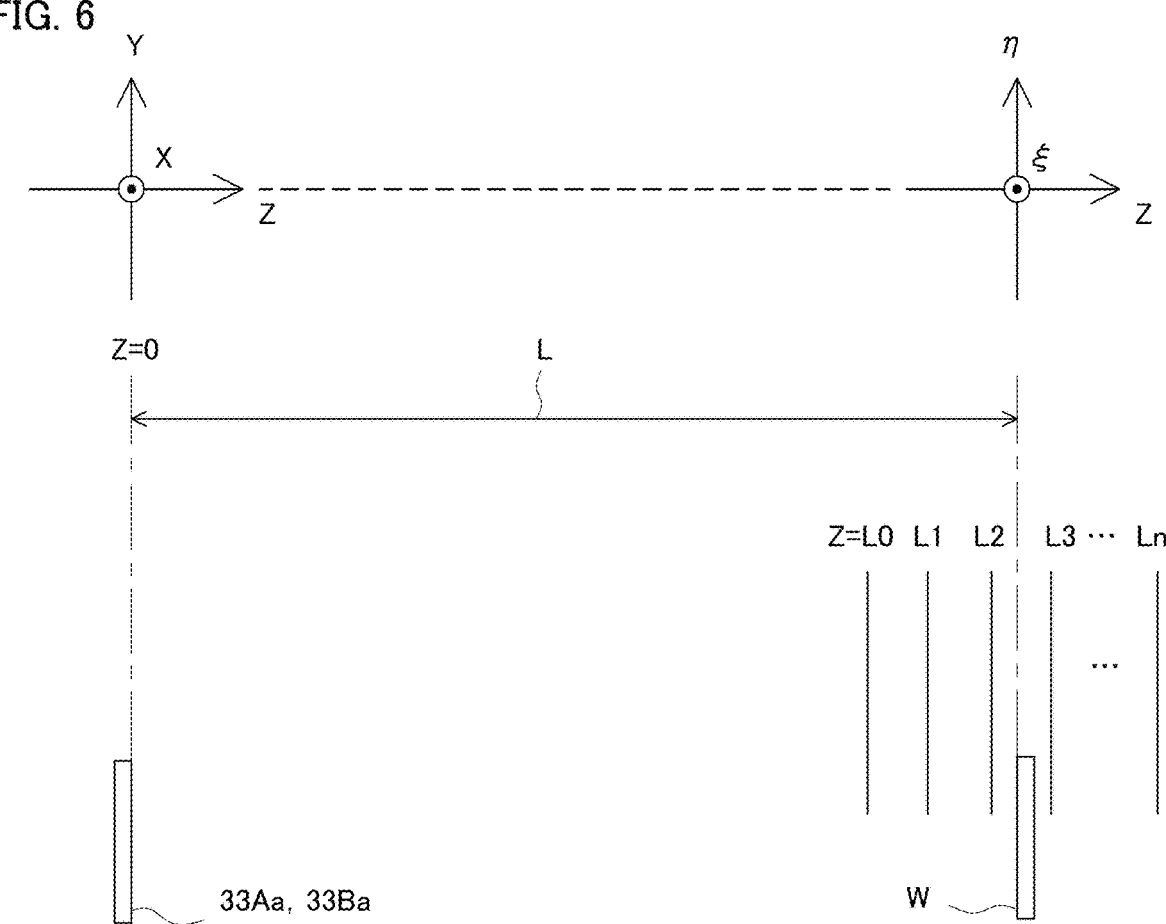

The first camera 33A is a known member provided with, for example, an imaging element 33Aa (shown in FIG. 6). According to one or more embodiments, a CCD area sensor is employed for the imaging element 33Aa of the first camera 33A. The imaging element 33Aa is, however, not limited to this example, and, for example, a CMOS area sensor or the like may also be employed.

Image data taken by the first camera 33A are converted into digital signals inside of the first camera 33A and are input in the form of the digital signals into the control device 5 (an image data storage device 54).

More specifically, an interference fringe image having the phase of "0 degree", an interference fringe image having the phase of "90 degrees", an interference fringe image having the phase of "180 degrees" and an interference fringe image having the phase of "270 degrees" with regard to the first light are taken by the first camera 33A.

Like the first imaging system 4A, the second imaging system 4B includes, for example, an imaging lens 30B, a quarter-wave plate 31B, a second polarizing plate 32B and a second camera 33B configuring the second imaging unit.

The imaging lens 30B is arranged such that a focal position on one side (second camera 33B-side) is positioned at an imaging element 33Ba described later and that a focal position on the other side (interference optical system 3-side) overlaps with a focal position on the second imaging system 4B-side of the objective lens 21 for the reference light and with a focal position on the second imaging system 4B-side of the objective lens 22 for the measurement light.

The imaging lens 30B accordingly serves to cause linearly polarized light (a reference light component and a measurement light component of the second light) emitted from the first face 20a of the polarizing beam splitter 20 and transmitted upward in the Y-axis direction through the first non-polarizing beam splitter 13A to be imaged on the second camera 33B (on the imaging element 33Ba). The imaging lens 30B may be configured by a lens unit consisting of a plurality of lenses or may be configured by one single lens.

The quarter-wave plate 31B is configured to convert each linearly polarized light (the reference light component and the measurement light component of the second light) that is transmitted upward in the Y-axis direction through the first non-polarizing beam splitter 13A and that passes through the imaging lens 30B into circularly polarized light.

Like the first polarizing plate 32A, the second polarizing plate 32B serves to cause each component of the second light converted into circularly polarized light by the quarter-wave plate 31B to be selectively transmitted therethrough. This configuration enables the reference light component and the measurement light component of the second light having different rotating directions to interfere with each other with respect to a specific phase. The "second polarizing plate 32B" configures the "phase shift unit" and the "interference unit" according to one or more embodiments.

The second polarizing plate 32B according to one or more embodiments is configured to be rotatable about the Y-axis direction as the axial center and is controlled to change a direction of a transmission axis by every 45 degrees. More specifically, the direction of the transmission axis is changed to "0 degree", "45 degrees", "90 degrees", and "135 degrees" to the X-axis direction.

This configuration enables the reference light component and the measurement light component of the second light transmitted through the second polarizing plate 32B to interfere with each other with respect to four different phases. This accordingly generates interference lights having different phases by 90 degrees each or more specifically generates an interference light having a phase of "0 degree", an interference light having a phase of "90 degrees", an interference light having a phase of "180 degrees", and an interference light having a phase of "270 degrees".

Like the first camera 33A, the second camera 33B is a known member provided with, for example, an imaging element 33Ba (shown in FIG. 6). According to one or more embodiments, as in the case of the first camera 33A, a CCD area sensor is employed for the imaging element 33Ba of the second camera 33B. The imaging element 33Ba is, however, not limited to this example, and, for example, a CMOS area sensor or the like may also be employed.

As in the case of the first camera 33A, image data taken by the second camera 33B are converted into digital signals inside of the second camera 33B and are input in the form of the digital signals into the control device 5 (the image data storage device 54).

More specifically, an interference fringe image having the phase of "0 degree", an interference fringe image having the phase of "90 degrees", an interference fringe image having the phase of "180 degrees" and an interference fringe image having the phase of "270 degrees" with regard to the second light are taken by the second camera 33B.

The following describes the electrical configuration of the control device 5. As shown in FIG. 2, the control device 5 includes a microcomputer 51 configured to control the entire three-dimensional measurement device 1, an input device 52 serving as the "input unit" configured by a keyboard and a mouse or a touch panel, a display device 53 serving as the "display unit" having a display screen such as a liquid crystal screen, an image data storage device 54 configured to successively store image data and the like taken by the cameras 33A and 33B, a calculation result storage device 55 configured to store the results of various calculations, and a set data storage device 56 configured to store in advance various pieces of information.

The microcomputer 51 includes, for example, a CPU 51a serving as a computing unit, a ROM 51b configured to store various programs, and a RAM 51c configured to temporarily store various data, for example, calculation data and input output data, and is electrically connected with the respective devices 52 to 56 described above.

The following describes the functions of the three-dimensional measurement device 1. According to one or more embodiments, as described later, radiation of the first light and radiation of the second light are performed simultaneously, and an optical path of the first light and an optical path of the second light partly overlap with each other. In order to facilitate understanding, the optical path of the first light and the optical path of the second light are individually described with reference to different drawings.

Figure 3:
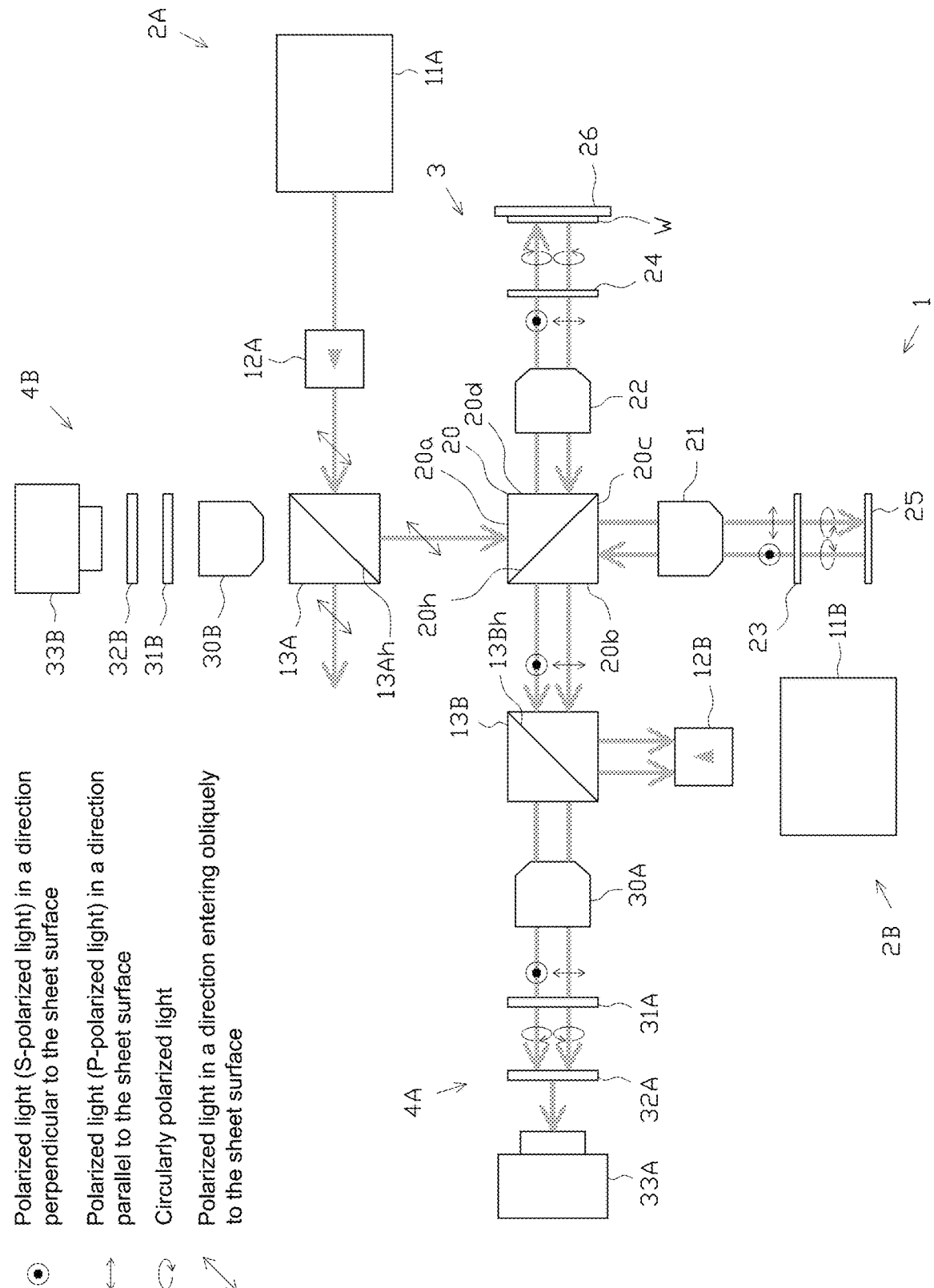
FIG. 3 is an optical path diagram illustrating an optical path of first light.

An optical path of the first light is described first with reference to FIG. 3. As shown in FIG. 3, the first light having the wavelength $\lambda_1$ (the linearly polarized light having the polarizing direction inclined at 45 degrees to the X-axis direction and the Y-axis direction) is emitted leftward in the Z-axis direction from the first light emitter 11A.

The first light emitted from the first light emitter 11A passes through the first light isolator 12A and enters the first non-polarizing beam splitter 13A. Part of the first light entering the first non-polarizing beam splitter 13A is transmitted leftward in the Z-direction, while the remaining part of the first light is reflected downward in the Y-axis direction.

The first light reflected downward in the Y-axis direction (the linearly polarized light having the polarizing direction inclined at 45 degrees to the X-axis direction and the Z-axis direction) enters the first face 20a of the polarizing beam splitter 20. The first light transmitted leftward in the Z-axis direction, on the other hand, does not enter any optical system but becomes unused light.

Such unused light may be utilized for measurement of the wavelength or for measurement of the light power as needed basis. This stabilizes the light source and enhances the accuracy of measurement.

With regard to the first light entering downward in the Y-axis direction from the first face 20a of the polarizing beam splitter 20, a P-polarized light component thereof is transmitted downward in the Y-axis direction and is emitted as reference light from the third face 20c, while an S-polarized light component thereof is reflected rightward in the Z-axis direction and is emitted as measurement light from the fourth face 20d.

The reference light (the P-polarized light) with regard to the first light emitted from the third face 20c of the polarizing beam splitter 20 to pass through the objective lens 21 passes through the quarter-wave plate 23 to be converted into clockwise circularly polarized light and is then reflected by the reference plane 25. The rotating direction relative to the traveling direction of light is maintained here. The reference light with regard to the first light then passes through the quarter-wave plate 23 again to be converted from the clockwise circularly polarized light into S-polarized light, passes through the objective lens 21 and re-enters the third face 20c of the polarizing beam splitter 20.

The measurement light (the S-polarized light) with regard to the first light emitted from the fourth face 20d of the polarizing beam splitter 20 to pass through the objective lens 22, on the other hand, passes through the quarter-wave plate 24 to be converted into counterclockwise circularly polarized light, and is then reflected by the work W. The rotating direction relative to the traveling direction of light is maintained here. The measurement light with regard to the first light then passes through the quarter-wave plate 24 again to be converted from the counterclockwise circularly polarized light into P-polarized light, passes through the objective lens 22 and re-enters the fourth face 20d of the polarizing beam splitter 20.

The reference light (the S-polarized light) with regard to the first light that re-enters the third face 20c of the polarizing beam splitter 20 is reflected leftward in the Z-axis direction by the joint surface 20h, while the measurement light (the P-polarized light) with regard to the first light that re-enters the fourth face 20d is transmitted leftward in the Z-axis direction through the joint surface 20h. A combined light obtained by combining the reference light and the measurement light with regard to the first light with each other is emitted as output light from the second face 20b of the polarizing beam splitter 20.

The combined light (the reference light and the measurement light) with regard to the first light emitted from the second face 20b of the polarizing beam splitter 20 enters the second non-polarizing beam splitter 13B. When the combined light with regard to the first light enters the second non-polarizing beam splitter 13B leftward in the Z-axis direction, part of the combined light is transmitted leftward in the Z-axis direction, and the remaining part of the combined light is reflected downward in the Y-axis direction. The combined light (the reference light and the measurement light) transmitted leftward in the Z-axis direction passes through the imaging lens 30A and enters the first imaging system 4A. The combined light reflected downward in the Y-axis direction is, on the other hand, blocked by the second light isolator 12B and becomes unused light.

When the combined light (the reference light and the measurement light) with regard to the first light passes through the imaging lens 30A and enters the first imaging system 4A, the quarter-wave plate 31A converts the reference light component (the S-polarized light component) of the combined light into counterclockwise circularly polarized light, while converting the measurement light component (the P-polarized light component) into clockwise circularly polarized light. The counterclockwise circularly polarized light and the clockwise circularly polarized light have different rotating directions and thus do not interfere with each other.

The combined light with regard to the first light subsequently passes through the first polarizing plate 32A, so that the reference light component and the measurement light component thereof interfere with each other in a phase corresponding to the angle of the first polarizing plate 32A. An image of such interference light with regard to the first light is taken by the first camera 33A.

Figure 4:
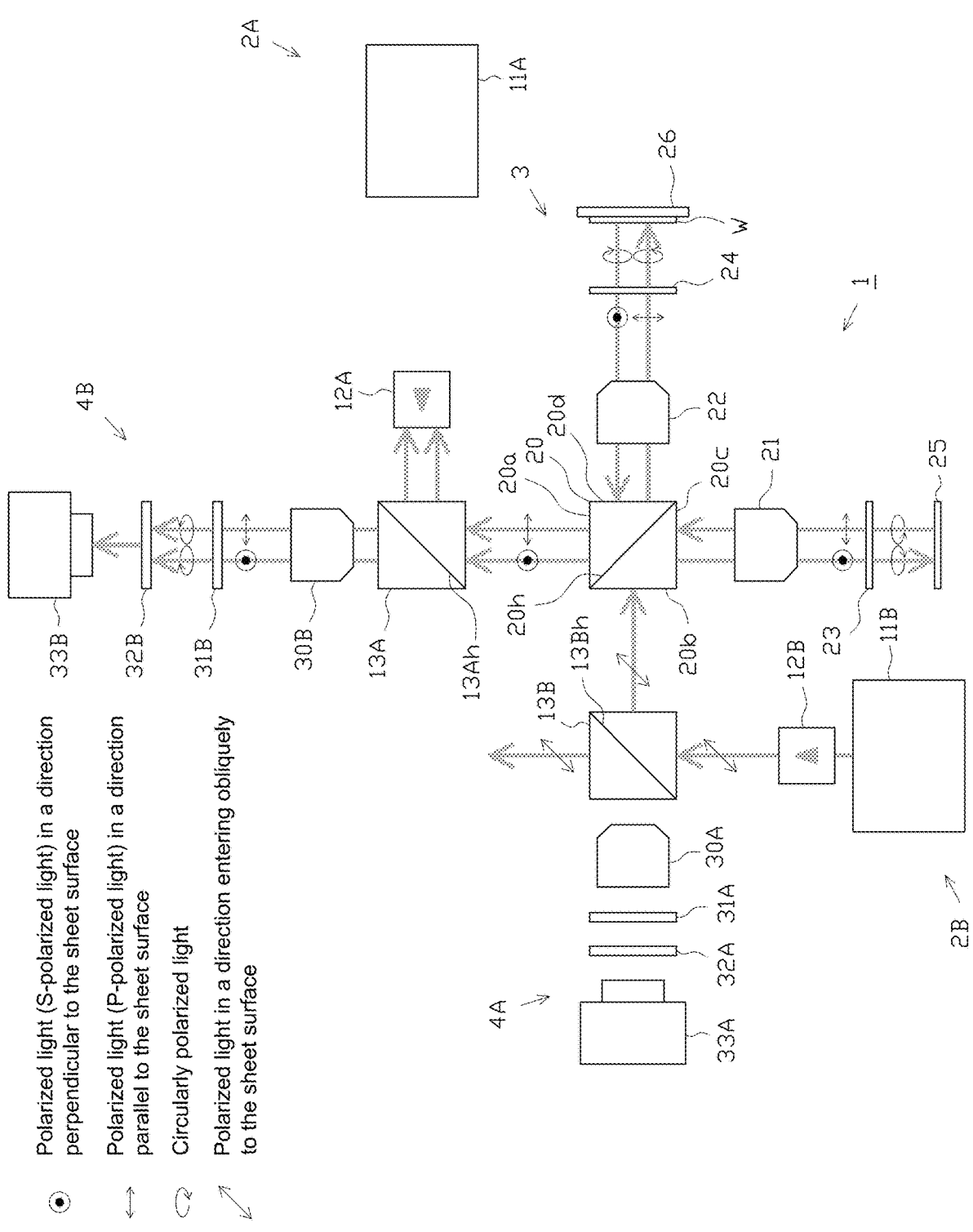
FIG. 4 is an optical path diagram illustrating an optical path of second light.

An optical path of the second light is described next with reference to FIG. 4. As shown in FIG. 4, the second light having the wavelength $\lambda_2$ (the linearly polarized light having the polarizing direction inclined at 45 degrees to the X-axis direction and the Z-axis direction) is emitted upward in the Y-axis direction from the second light emitter 11B.

The second light emitted from the second light emitter 11B passes through the second light isolator 12B and enters the second non-polarizing beam splitter 13B. Part of the second light entering the second non-polarizing beam splitter 13B is transmitted upward in the Y-direction, while the remaining part of the second light is reflected rightward in the Z-axis direction.

The second light reflected rightward in the Z-axis direction (the linearly polarized light having the polarizing direction inclined at 45 degrees to the X-axis direction and the Y-axis direction) enters the second face 20b of the polarizing beam splitter 20. The second light transmitted upward in the Y-axis direction, on the other hand, does not enter any optical system but becomes unused light.

Such unused light may be utilized for measurement of the wavelength or for measurement of the light power as needed basis. This stabilizes the light source and enhances the accuracy of measurement.

With regard to the second light entering rightward in the Z-axis direction from the second face 20b of the polarizing beam splitter 20, an S-polarized light component thereof is reflected downward in the Y-axis direction and is emitted as reference light from the third face 20c, while a P-polarized light component thereof is transmitted rightward in the Z-axis direction and is emitted as measurement light from the fourth face 20d.

The reference light (the S-polarized light) with regard to the second light emitted from the third face 20c of the polarizing beam splitter 20 to pass through the objective lens 21 passes through the quarter-wave plate 23 to be converted into counterclockwise circularly polarized light and is then reflected by the reference plane 25. The rotating direction relative to the traveling direction of light is maintained here. The reference light with regard to the second light then passes through the quarter-wave plate 23 again to be converted from the counterclockwise circularly polarized light into P-polarized light, passes through the objective lens 21 and re-enters the third face 20c of the polarizing beam splitter 20.

The measurement light (the P-polarized light) with regard to the second light emitted from the fourth face 20d of the polarizing beam splitter 20 to pass through the objective lens 22, on the other hand, passes through the quarter-wave plate 24 to be converted into clockwise circularly polarized light, and is then reflected by the work W. The rotating direction relative to the traveling direction of light is maintained here.

The measurement light with regard to the second light then passes through the quarter-wave plate 24 again to be converted from the clockwise circularly polarized light into S-polarized light, passes through the objective lens 22 and re-enters the fourth face 20d of the polarizing beam splitter 20.

The reference light (the P-polarized light) with regard to the second light that re-enters the third face 20c of the polarizing beam splitter 20 is transmitted upward in the Y-axis direction through the joint surface 20h, while the measurement light (the S-polarized light) with regard to the second light that re-enters the fourth face 20d is reflected upward in the Y-axis direction by the joint surface 20h. A combined light obtained by combining the reference light and the measurement light with regard to the second light with each other is emitted as output light from the first face 20a of the polarizing beam splitter 20.

The combined light (the reference light and the measurement light) with regard to the second light emitted from the first face 20a of the polarizing beam splitter 20 enters the first non-polarizing beam splitter 13A. When the combined light with regard to the second light enters the first non-polarizing beam splitter 13A upward in the Y-axis direction, part of the combined light is transmitted upward in the Y-axis direction, and the remaining part of the combined light is reflected rightward in the Z-axis direction. The combined light (the reference light and the measurement light) transmitted upward in the Y-axis direction passes through the imaging lens 30B and enters the second imaging system 4B. The combined light reflected rightward in the Z-axis direction is, on the other hand, blocked by the first light isolator 12A and becomes unused light.

When the combined light (the reference light and the measurement light) with regard to the second light passes through the imaging lens 30B and enters the second imaging system 4B, the quarter-wave plate 31B converts the reference light component (the P-polarized light component) of the combined light into clockwise circularly polarized light, while converting the measurement light component (the S-polarized light component) into counterclockwise circularly polarized light. The counterclockwise circularly polarized light and the clockwise circularly polarized light have different rotating directions and thus do not interfere with each other.

The combined light with regard to the second light subsequently passes through the second polarizing plate 32B, so that the reference light component and the measurement light component thereof interfere with each other in a phase corresponding to the angle of the second polarizing plate 32B. An image of such interference light with regard to the second light is taken by the second camera 33B.

The following describes a procedure of a measurement process performed by the control device 5 in detail with reference to the flowchart of FIG. 5 and other drawings. In the following description of this measurement process, it is assumed that an x-y plane is assumed to be either an imaging element 33Aa-face of the first camera 33A or an imaging element 33Ba-face of the second camera 33B and that a z direction is a direction of an optical axis perpendicular thereto. This coordinate system (x, y, z) is a different coordinate system from a coordinate system (X, Y, Z) used to described the entire three-dimensional measurement device 1.

At step S1, the control device 5 first performs a process of obtaining interference fringe images with regard to a predetermined measurement area of the work W (the entirety or part of the work W). According to one or more embodiments, the control device 5 obtains four different interference fringe images having different phases with regard to the first light and four different interference fringe images having different phases with regard to the second light. This is described more in detail below.

After placement of the work W on the mounting portion 26, the control device 5 sets the direction of the transmission axis of the first polarizing plate 32A in the first imaging system 4A to a predetermined reference position (for example, "0 degree") and sets the direction of the transmission axis of the second polarizing plate 32B in the second imaging system 4B to a predetermined reference position (for example, "0 degree").

The control device 5 subsequently causes the first light to be radiated from the first projection optical system 2A and simultaneously causes the second light to be radiated from the second projection optical system 2B. As a result, the combined light (the reference light and the measurement light) with regard to the first light is emitted from the second face 20b of the polarizing beam splitter 20 in the interference optical system 3, and at the same time, the combined light (the reference light and the measurement light) with regard to the second light is emitted from the first face 20a of the polarizing beam splitter 20.

An image of the combined light with regard to the first light emitted from the second face 20b of the polarizing beam splitter 20 is taken by the first imaging system 4A, while an image of the combined light with regard to the second light emitted from the first face 20a of the polarizing beam splitter 20 is taken by the second imaging system 4B.

In this state, the direction of the transmission axis of the first polarizing plate 32A and the direction of the transmission axis of the second polarizing plate 32B are respectively set to "0 degree", so that the first camera 33A takes an interference fringe image having the phase of "0 degree" with regard to the first light, and the second camera 33B takes an interference fringe image having the phase of "0 degree" with regard to the second light.

Image data respectively taken are output from the respective cameras 33A and 33B to the control device 5. The control device 5 stores the input image data into the image data storage device 54.

The control device 5 subsequently performs a switching process of switching between the first polarizing plate 32A of the first imaging system 4A and the second polarizing plate 32B of the second imaging system 4B. More specifically, the control device 5 respectively rotates and shifts the first polarizing plate 32A and the second polarizing plate 32B to respective positions having the directions of transmission axis equal to "45 degrees".

On completion of the switching process, the control device 5 performs a second imaging process similar to the series of the first imaging process described above. More specifically, the control device 5 causes the first light to be radiated from the first projection optical system 2A and simultaneously causes the second light to be radiated from the second projection optical system 2B. The control device 5 then causes an image of the combined light with regard to the first light emitted from the second face 20b of the polarizing beam splitter 20 to be taken by the first imaging system 4A and at the same time causes an image of the combined light with regard to the second light emitted from the first face 20a of the polarizing beam splitter 20 to be taken by the second imaging system 4B. The control device 5 accordingly obtains an interference fringe image having the phase of "90 degrees" with regard to the first light and obtains an interference fringe image having the phase of "90 degrees" with regard to the second light.

Two more imaging processes similar to the first imaging process and the second imaging process described above are repeated. More specifically, the control device 5 performs a third imaging process in the state that the respective directions of transmission axis of the first polarizing plate 32A and the second polarizing plate 32B are set to "90 degrees" to obtain an interference fringe image having the phase of "180 degrees" with regard to the first light and obtain an interference fringe image having the phase of "180 degrees" with regard to the second light.

The control device 5 subsequently performs a fourth imaging process in the state that the respective directions of transmission axis of the first polarizing plate 32A and the second polarizing plate 32B are set to "135 degrees" to obtain an interference fringe image having the phase of "270 degrees" with regard to the first light and obtain an interference fringe image having the phase of "270 degrees" with regard to the second light.

Performing the four imaging processes as described above obtains all the image data required for measurement relating to the predetermined measurement area of the work W (a total of eight interference fringe images consisting of four interference fringe images with regard to the first light and four interference fringe images with regard to the second light).

At subsequent step S2, the control device 5 performs a process of obtaining complex amplitude data of light on the imaging element 33Aa-face or on the imaging element 33Ba-face.

According to one or more embodiments, the control device 5 obtains complex amplitude data Eo(x,y) of light on the imaging element 33Aa-face or on the imaging element 33Ba-face with regard to each of the first light and the second light, based on the four interference fringe images with regard to the first light and the four interference fringe images with regard to the second light stored in the image data storage device 54.

Interference fringe intensities, i.e., luminances $I_1(x,y)$, $I_2(x,y)$, $I_3(x,y)$ and $I_4(x,y)$, at an identical coordinate position $(x,y)$ in the four interference fringe images with regard to the first light or with regard to the second light are expressed by relational expressions of [Math. 1] given below:

$$I_1(x,y)=B(x,y)+A(x,y)\cos[\Delta\phi(x,y)]$$

$$I_2(x,y)=B(x,y)+A(x,y)\cos[\Delta\phi(x,y)+90°]$$

$$I_3(x,y)=B(x,y)+A(x,y)\cos[\Delta\phi(x,y)+180°]$$

$$I_4(x,y)=B(x,y)+A(x,y)\cos[\Delta\phi(x,y)+270°] \quad \text{[Math. 1]}$$

Herein $\Delta\phi(x,y)$ denotes a phase difference based on an optical path difference between the measurement light and the reference light at the coordinates $(x,y)$; $A(x,y)$ denotes an amplitude of interference light; and $B(x,y)$ denotes a bias. Since the reference light is uniform, from this viewpoint as the basis, $\Delta\phi(x,y)$ denotes a "phase of the measurement light" and $A(x,y)$ denotes an "amplitude of the measurement light".

Accordingly, the phase $\Delta\phi(x,y)$ of the measurement light reaching the imaging element 33Aa-face or the imaging element 33Ba-face is determined from a relational expression of [Math. 2] given below, based on the relational expressions of [Math. 1] given above:

$$\Delta\phi(x,y) = \arctan\frac{I_4(x,y) - I_2(x,y)}{I_1(x,y) - I_3(x,y)} \quad \text{[Math. 2]}$$

An amplitude A(x,y) of the measurement light reaching the imaging element 33Aa-face or the imaging element 33Ba-face is determined from a relational expression of [Math. 3] given below, based on the relational expressions of [Math. 1] given above:

$$A(x,y) = \frac{1}{2} \times \sqrt{\{I_1(x,y) - I_3(x,y)\}^2 + \{I_4(x,y) - I_2(x,y)\}^2} \quad \text{[Math. 3]}$$

The complex amplitude data Eo(x,y) on the imaging element 33Aa-face or on the imaging element 33Ba-face is calculated from the phase $\Delta\phi(x,y)$ and the amplitude $A(x,y)$ described above according to a relational expression of [Math. 4] given below, where I denotes an imaginary unit:

$$E_0(x,y)=A(x,y)e^{i\phi(x,y)} \quad \text{[Math. 4]}$$

Figure 7:
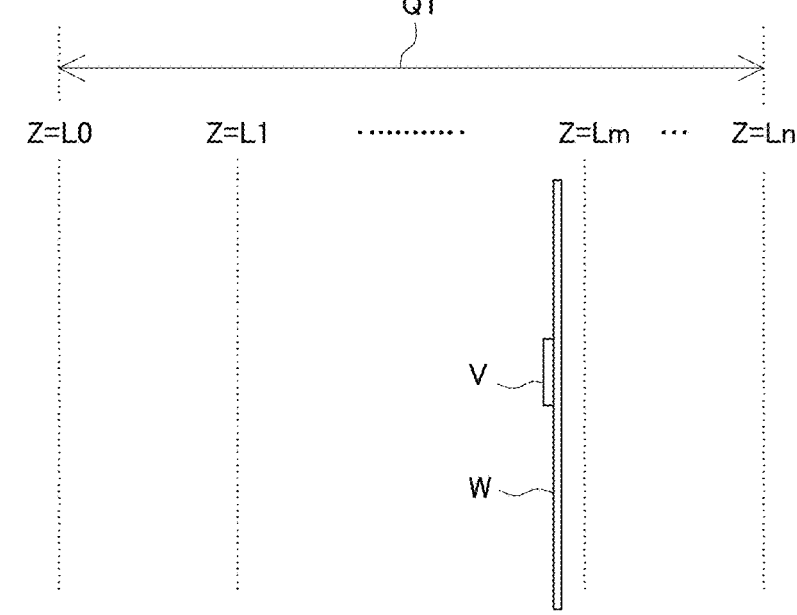

At subsequent step S3, the control device 5 performs a process of obtaining complex amplitude data at a plurality of positions in the z direction with regard to a specific area V (shown in FIG. 7) that is a part set in advance in the measurement area on the work W.

According to one or more embodiments, the control device 5 obtains complex amplitude data with regard to the specific area V at every predetermined measurement range interval in a predetermined range Q1 in the z direction (in a first range in the direction of the optical axis) where the work W is likely to be present, on the basis of a device origin that is a standard of height measurement in the three-dimensional measurement device 1.

The "specific area V" herein is an area arbitrarily set to grasp the position of the work W in the z direction in advance. For example, when the work W is a wafer substrate 100 as shown in FIGS. 8 and 9, a pattern portion 102 that is served as a reference plane for height measurement of a bump 101 is set as the specific area V.

Figure 8:
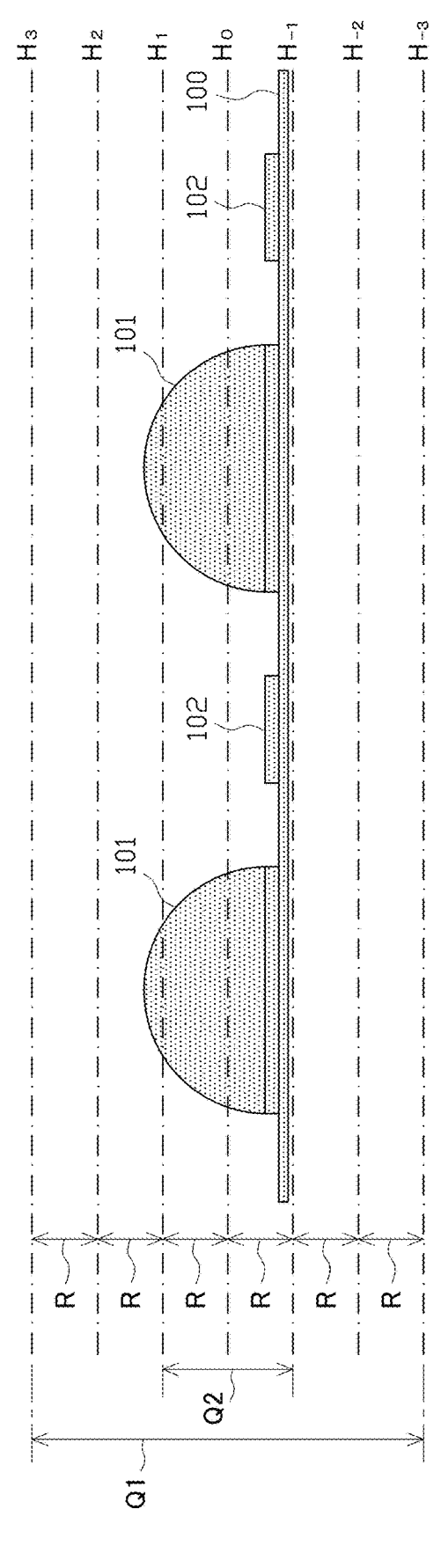
FIG. 8 is a schematic diagram illustrating three-dimensional measurement of a wafer substrate.
Figure 9:
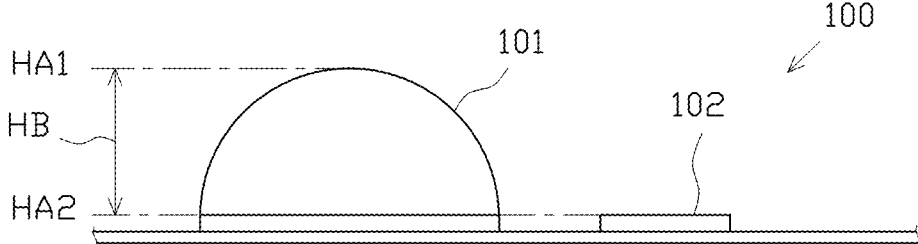
FIG. 9 is a schematic diagram illustrating three-dimensional measurement of a bump.

A measurement example of the wafer substrate 100 shown in FIG. 8 is configured to obtain complex amplitude data at height positions $H_3$, $H_2$, $H_1$, $H_0$, $H_{-1}$, $H_{-2}$ and $H_{-3}$ set at every measurement range interval R in the vertical direction from a device origin $H_0$, as the center, that is the standard of height measurement in the three-dimensional measurement device 1.

The following describes the method of obtaining the complex amplitude data at step S3 in detail. The description first refers to a method of obtaining unknown complex amplitude data at a different position in the z direction from known complex amplitude data at a predetermined position in the z direction.

Two coordinate systems (an x-y coordinate system and a ξ-η coordinate system) that are away from each other by a distance d in the z direction are assumed here. A relationship shown by [Math. 5] given below is obtained by expressing the x-y coordinate system as z=0, known complex amplitude data of light in the x-y coordinate system as Eo(x,y) and unknown complex amplitude data of light in a ξ-η plane away from the x-y plane by the distance d as Eo(ξ,η), where λ denotes a wavelength.

$$E_0(x,y) = \frac{i}{\lambda} \int_{-\infty}^{\infty} \int_{-\infty}^{\infty} E_0(\xi,\eta) \frac{\exp\left(-i\frac{2\pi}{\lambda}\sqrt{\frac{d^2 + (\xi - x)^2 +}{(\eta - y)^2}}\right)}{\sqrt{d^2 + (\xi - x)^2 + (\eta - y)^2}} d\xi d\eta \quad \text{[Math. 5]}$$

27                                                    28

-continued $$= \mathcal{F}^{-1}\{\mathcal{F}(E_0(\xi,\eta))\cdot\mathcal{F}(g(\xi,\eta,x,y))\}$$

$$g(\xi,\eta,x,y) = \frac{i}{\lambda}\frac{\exp\left(-i\frac{2\pi}{\lambda}\sqrt{d^2+(\xi-x)^2+(\eta-y)^2}\right)}{\sqrt{d^2+(\xi-x)^2+(\eta-y)^2}}$$

$\mathcal{F}$: Fourier transform $\mathcal{F}^{-1}$: inverse Fourier transform

An expression of [Math. 6] given below is obtained by solving this relational expression with regard to Eo($\xi$,$\eta$)

$$E_0(\xi,\eta) = \mathcal{F}^{-1}\left\{\frac{\mathcal{F}(E_0(x,y))}{\mathcal{F}(g(\xi,\eta,x,y))}\right\} \qquad \text{[Math. 6]}$$

Accordingly, at step S3, complex amplitude data EoL0 ($\xi$,$\eta$), EoL1($\xi$,$\eta$), . . . , EoLn($\xi$,$\eta$) at positions away from the imaging element 33Aa-face or the imaging element 33Ba-face by a distance L=L0, L1, L2, . . . , Ln in the z direction (z=L0, L1, . . . , Ln) are obtained, based on the complex amplitude data Eo(x,y) on the imaging element 33Aa-face or on the imaging element 33Ba-face obtained at step S2 described above, as shown in FIGS. 6 and 7.

At subsequent step S4, the control device 5 performs process of obtaining intensity image (luminance image) data at a plurality of positions in the z direction with regard to the specific area V.

More specifically, the control device 5 obtains intensity image data from the respective complex amplitude data EoL0($\xi$,$\eta$), EoL1($\xi$,$\eta$), . . . , EoLn($\xi$,$\eta$) at the plurality of positions in the z direction with regard to the specific area V obtained at step S3 described above. Accordingly, the function of performing the series of reconstruction process at steps S2 to S4 described above configures the first image data obtaining unit according to one or more embodiments.

When the complex amplitude data in the $\xi$-$\eta$ plane is expressed as Eo($\xi$,$\eta$), intensity image data I($\xi$,$\eta$) in the $\xi$-$\eta$ plane is determined according to a relational expression of [Math. 7] given below]

$$I(\xi,\eta)=|E_0(\xi,\eta)|^2 \qquad \text{[Math. 7]}$$

At subsequent step S5, the control device 5 performs a process of determining an optimum focusing position (focusing position in the direction of the optical axis) with regard to the specific area V. The function of performing this process of step S5 configures the first focusing position determination unit according to one or more embodiments.

More specifically, the control device 5 determines an optimum focusing position in the z direction with regard to the specific area V, based on the intensity image data at the plurality of positions in the z direction with regard to the specific area V obtained at step S4 described above. The following describes a method of determining the optimum focusing position with regard to the specific area V from the contrast of the intensity image data.

This method first determines a contrast between a luminance at a "specific coordinate position" and a luminance at "another coordinate position", based on the intensity image data of the specific area V at the respective positions in the z direction (z=L0, L1, . . . , Ln) away from the imaging element 33Aa-face or the imaging element 33Ba-face in the z direction by the distance L=L0, L1, L2, . . . , Ln. The method subsequently extracts a position (z=Lm) where the intensity image data of the highest contrast is obtained, as the optimum focusing position.

The method of determining the optimum focusing position with regard to the specific area V is not limited to this method of determination from the contrast of the intensity image data described above, but another method, for example, a method of determination from the luminance of the intensity image data, may be employed.

This latter method takes advantage of the characteristic of the intensity image data that has the highest luminance on a face where an object is actually present. More specifically, this method determines an average luminance at each of coordinate position in the specific area V, based on the intensity image data with regard to the specific area V at the respective positions in the z direction (z=L0, L1, . . . , Ln). The method subsequently extracts a position (z=Lm) where the intensity image data of the highest average luminance is obtained, as the optimum focusing position.

For example, in the measurement example of the wafer substrate 100 shown in FIG. 8, the control device 5 determines the contrast or the average luminance with regard to the intensity image data of the pattern portion 102 at the height positions $H_3$, $H_2$, $H_1$, $H_0$, $H_{-1}$, $H_{-2}$ and $H_{-3}$ and extracts the position where the intensity image data of the highest contrast or the intensity image data of the highest average luminance (for example, the height position $H_{-1}$) among these intensity image data, as the optimum focusing position.

At subsequent step S6, the control device 5 performs a process of obtaining complex amplitude data at a plurality of positions in the z direction with regard to each of coordinate positions in the entirety of the predetermined measurement area of the work W.

According to one or more embodiments, the control device 5 obtains complex amplitude data with regard to each of the coordinate positions in the measurement area at every predetermined measurement range interval in a predetermined range Q2 in the z direction (in a second range in the direction of the optical axis) where a predetermined measurement target on the work W (for example, a bump 101 on the wafer substrate 100) is likely to be present, on the basis of the optimum focusing position with regard to the specific area V determined at step S5 described above.

For example, the measurement example of the wafer substrate 100 shown in FIG. 8 is configured to obtain complex amplitude data at the respective height positions $H_1$, $H_0$ and $H_{-1}$ set at every measurement range interval R in an upward direction, on the basis of the optimum focusing position (height position $H_{-1}$) of the specific area V.

In the example shown in FIG. 8, the predetermined range Q2 in the z direction is set to be narrower than the predetermined range Q1 in the z direction. This is, however, not essential. The predetermined range Q2 in the z direction may be set to be identical with or may be set to be wider than the predetermined range Q1 in the z direction. In this regard, however, the predetermined range Q2 in the z direction may be set to be narrower than the predetermined range Q1 in the z direction, in terms of reducing the load of the process of obtaining data required for three-dimensional measurement with regard to each of the coordinate positions in the entire measurement area and shortening the time period required for this process.

The method of obtaining the complex amplitude data at step S6 is similar to the method of obtaining the complex amplitude data at step S3 described above and is thus not described in detail.

At subsequent step S7, the control device 5 performs a process of obtaining intensity image data at a plurality of positions in the z direction, with regard to each of the coordinate positions in the measurement area on the work W. Accordingly, the function of performing the series of processes at steps S6 and S7 described above configures the second image data obtaining unit according to one or more embodiments.

More specifically, the control device 5 obtains intensity image data at a plurality of positions in the z direction, with regard to each of the coordinate positions in the measurement area on the work W, based on the complex amplitude data obtained at step S6 described above. The method of obtaining the intensity image data from the complex amplitude data at step S7 is similar to the method of obtaining the intensity image data at step S4 described above and is thus not described in detail.

At subsequent step S8, the control device 5 performs a process of determining an optimum focusing position (focusing position in the direction of the optical axis) with regard to each of the coordinate positions in the measurement area on the work W. The function of performing this process of step S8 configures the second focusing position determination unit according to one or more embodiments.

More specifically, the control device 5 determines the optimum focusing position in the z direction with regard to each of the coordinate positions in the measurement area, based on the intensity image data at the plurality of positions in the z direction with regard to each of the coordinate positions in the measurement area obtained at step S7 described above. The method of determining the optimum focusing position from the intensity image data at the plurality of positions in the z direction at step S8 is similar to the method of determining the optimum focusing position at step S5 described above and is thus not described in detail.

At subsequent step S9, the control device 5 performs a process of specifying an order corresponding to the optimum focusing position with regard to each of the coordinate positions in the measurement area on the work W determined at step S8, as an order of a measurement range with regard to each of the coordinate positions. The function of performing this process of step S9 configures the order specification unit according to one or more embodiments.

A method of specifying the order of the measurement range is described below with reference to a concrete example illustrated in FIG. 11. In the example illustrated in FIG. 11, the wafer substrate 100 shown in FIG. 8 is subjected to height measurement in a range of "−3500 (nm)" to "3500 (nm)" by using light having a measurement range (corresponding to one period [−180 degrees to 180 degrees] of a sinusoidal wave in a phase shift method) of 1000 nm (composite wavelength light of two wavelengths according to one or more embodiments).

In a "Case 1" shown in FIG. 11, among intensity image data reconstructed at height positions $H_3$, $H_2$, $H_1$, $H_0$, $H_{-1}$, $H_{-2}$ and $H_{-3}$ (reconstructed images [1] to [7]) with regard to a predetermined coordinate position, the intensity image data reconstructed at the height position $H_2$ (reconstructed image [2]) has a maximum luminance value of "250". Accordingly, the height position $H_2$ is specified as the optimum focusing position with regard to this coordinate position, and the order [2] corresponding to this optimum focusing position is specified as the order of the measurement range with regard to this coordinate position.

In "Case 2" shown in FIG. 11, among intensity image data reconstructed at height positions $H_3$, $H_2$, $H_1$, $H_0$, $H_{-1}$, $H_{-2}$ and $H_{-3}$ (reconstructed images [1] to [7]) with regard to a predetermined coordinate position, both the intensity image data reconstructed at the height position $H_2$ (reconstructed image [2]) and the intensity image data reconstructed at the height position $H_1$ (reconstructed image [1]) have a maximum luminance value of "128".

In this case, the actual height with regard to this coordinate position is expected to be a height corresponding to the vicinity of the boundary between the measurement range of the order [2] and the measurement range of the order [1]. At this time, the two orders [2] and [1] are specified as the orders of the measurement range with regard to this coordinate position.

At subsequent step S10, the control device 5 performs a three-dimensional measurement process. The function of performing this process of step S10 configures the three-dimensional measurement unit according to one or more embodiments.

The control device 5 first calculates a phase $\phi(\xi,\eta)$ of the measurement light and an amplitude $A(\xi,\eta)$ of the measurement light from the complex amplitude data $Eo(\xi,\eta)$ at the optimum focusing position with regard to each of the coordinate positions in the measurement area determined at step S8, according to a relational expression of [Math. 8] given below:

$$E_0(\xi,\eta)=A(\xi,\eta)e^{i\phi(\xi,\eta)} \qquad \text{[Math. 8]}$$

The phase $\phi(\xi,\eta)$ of the measurement light is determined according to a relational expression of [Math. 9] given below. The function of performing the series of reconstruction process to calculate the phase $\phi(\xi,\eta)$ that is the phase information of the measurement light configures the phase information obtaining unit according to one or more embodiments.

$$\phi(\xi, \eta) = \arctan\frac{\mathrm{Im}[E_0(\xi, \eta)]}{\mathrm{Re}[E_0(\xi, \eta)]} \qquad \text{[Math. 9]}$$

The amplitude $A(\xi,\eta)$ of the measurement light is determined according to a relational expression of [Math. 10] given below:

$$A(\xi,\eta)=\sqrt{(\mathrm{Re}[E_0(\xi,\eta)])^2+(\mathrm{Im}[E_0(\xi,\eta)])^2} \qquad \text{[Math. 10]}$$

The control device 5 subsequently performs a phase-height conversion process and calculates height information $z(\xi,\eta)$ in the measurement range that shows the surface roughness or the concavo-convex configuration on the surface of the work W in a three-dimensional manner.

The height information $z(\xi,\eta)$ in the measurement range is calculated according to a relational expression of [Math. 11] given below:

$$Z(\xi, \eta) = \frac{1}{2}\phi(\xi, \eta)\frac{\lambda}{2\pi} \qquad \text{[Math. 11]}$$

The control device 5 then obtains true height data (actual height) with regard to each coordinate position, based on the height information $z(\xi,\eta)$ in the measurement range calculated as described above and the order of the measurement range with regard to the coordinate position specified at step S9.

For example, in the example illustrated in FIG. 11, in the case where the height information $z(\xi,\eta)$ in the measurement range calculated as described above with regard to a predetermined coordinate position corresponds to a phase "+90 degrees", candidates of true height data with regard to the coordinate position are "3250 (nm)" of the order [3], "2250 (nm)" of the order [2], "1250 (nm)" of the order [1], "250 (nm)" of the order [0], "−750 (nm)" of the order [−1], "−1750 (nm)" of the order [−2], and "−2750 (nm)" of the order [−3].

As in the "Case 1", for example, when the height position $H_2$ is the optimum focusing position with regard to the coordinate position and the corresponding order [2] is specified as the order of the measurement range with regard to the coordinate position, the true height data with regard to the coordinate position is specified as "2250 (nm)" corresponding to the phase "90 degrees" of the order [2].

In another example, in the example illustrated in FIG. 11, in the case where the height information $z(\xi,\eta)$ in the measurement range calculated as described above with regard to a predetermined coordinate position corresponds to a phase "−180 degrees", candidates of true height data with regard to the coordinate position are "2500 (nm)" of the order [3], "1500 (nm)" of the order [2], "500 (nm)" of the order [1], "−500 (nm)" of the order [0], "−1500 (nm)" of the order [−1], "−2500 (nm)" of the order [−2], and "3500 (nm)" of the order [−3].

As in the "Case 2", for example, when the height position $H_2$ and the height position $H_1$ are the optimum focusing positions with regard to the coordinate position and the corresponding order [2] and the corresponding order [1] are specified as the orders of the measurement range with regard to the coordinate position, the true height data with regard to the coordinate position is specified as "1500 (nm)" corresponding to the phase "−180 degrees" of the order [2].

In the case where the work W is a wafer substrate 100 (shown in FIG. 9) and a bump 101 is a measurement target, a height HB of the bump 101 relative to a pattern portion 102 as a measurement reference plane is determined by subtracting an absolute height HA2 of the pattern portion 102 in the periphery of the bump 101 from an absolute height HA1 of the bump 101 [HB=HA1−HA2].

The absolute height HA2 of the pattern portion 102 may be, for example, an absolute height at one arbitrary point on the pattern portion 102 or an average value of absolute heights in a predetermined range on the pattern portion 102. The "absolute height HA1 of the bump 101" and the "absolute height HA2 of the pattern portion 102" may be determined from the height information $z(\xi,\eta)$ and the order of the measurement range.

The results of the measurement of the work W determined as described above are stored in the calculation result storage device 55 of the control device 5.

The measurement using two different types of lights having different wavelengths (wavelengths $\lambda_1$ and $\lambda_2$) is equivalent to the measurement using the light of the composite wavelength $\lambda_0$. The measurement range thereof is expanded to $\lambda_0/2$. The composite wavelength $\lambda_0$ is expressed by Expression (M1) given below:

$$\lambda_0=(\lambda_1\times\lambda_2)/(\lambda_2-\lambda_1) \qquad (M1)$$

where $\lambda_2>\lambda_1$.

For example, when $\lambda_1=1500$ nm and $\lambda_2=1503$ nm, $\lambda_0=751.500$ μm according to Expression (M1) given above, and the measurement range $\lambda_0/2=375.750$ μm.

This is described more in detail. According to one or more embodiments, a phase $\phi_1(\xi,\eta)$ of measurement light with regard to a first light having a wavelength $\lambda_1$ at coordinates $(\xi,\eta)$ on a work W-surface is calculated (refer to [Math. 9] given above), based on luminances $I_1(x,y)$, $I_2(x,y)$, $I_3(x,y)$ and $I_4(x,y)$ of four different interference fringe images with regard to the first light (refer to [Math. 1] given above).

Under the measurement with regard to the first light, height information $z(\xi,\eta)$ at the coordinates $(\xi,\eta)$ is expressed by Expression (M2) given below:

$$z(\xi, \eta) = d_1(\xi, \eta)/2 \qquad (M2)$$
$$= \{\lambda_1 \times \phi_1(\xi, \eta)/4\pi\} + \{m_1(\xi, \eta) \times \lambda_1/2\}$$

where $d_1(\xi,\eta)$ denotes an optical path difference between measurement light and reference light with regard to the first light, and $m_1(\xi,\eta)$ denotes a fringe order with regard to the first light.

Accordingly, the phase $\phi_1(\xi,\eta)$ is expressed by Expression (M2') given below:

$$\phi_1(\xi,\eta)=(4\pi/\lambda_1)\times z(\xi,\eta)-2\pi m_1(\xi,\eta) \qquad (M2')$$

Similarly, a phase $\phi_2(\xi,\eta)$ of measurement light with regard to a second light having a wavelength $\lambda_2$ at coordinates $(\xi,\eta)$ on the work W-surface is calculated (refer to [Math. 9] given above), based on luminances $I_1(x,y)$, $I_2(x,y)$, $I_3(x,y)$ and $I_4(x,y)$ of four different interference fringe images with regard to the second light (refer to [Math. 1] given above).

Under the measurement with regard to the second light, height information $z(\xi,\eta)$ at the coordinates $(\xi,\eta)$ is expressed by Expression (M3) given below:

$$z(\xi, \eta) = d_2(\xi, \eta)/2 \qquad (M3)$$
$$= \{\lambda_2 \times \phi_2(\xi, \eta)/4\pi\} + \{m_2(\xi, \eta) \times \lambda_2/2\}$$

where $d_2(\xi,\eta)$ denotes an optical path difference between measurement light and reference light with regard to the second light, and $m_2(\xi,\eta)$ denotes a fringe order with regard to the second light.

Accordingly, the phase $\phi_2(\xi,\eta)$ is expressed by Expression (M3') given below:

$$\phi_2(\xi,\eta)=(4\pi/\lambda_2)\times z(\xi,\eta)-2\pi m_2(\xi,\eta) \qquad (M3')$$

The fringe order $m_1(\xi,\eta)$ with regard to the first light having the wavelength $\lambda_1$ and the fringe order $m_2(\xi,\eta)$ with regard to the second light having the wavelength $\lambda_2$ are determined, based on an optical path difference $\Delta d$ and a wavelength difference $\Delta\lambda$ between the two different types of lights (the wavelengths $\lambda_1$ and $\lambda_2$). The optical path difference $\Delta d$ and the wavelength difference $\Delta\lambda$ are respectively expressed by Expressions (M4) and (M5) given below:

$$\Delta d=(\lambda_1\times\phi_1-\lambda_2\times\phi_2)/2\pi \qquad (M4)$$

$$\Delta\lambda=\lambda_2-\lambda_1 \qquad (M5)$$

where $\lambda_2>\lambda_1$.

In the measurement range of the composition wavelength $\lambda_0$ of the two wavelengths, the relationship between the fringe orders $m_1$ and $m_2$ is classified into the following three cases: each case employs a different computational expression to determine the fringe orders $m_1(\xi,\eta)$ and $m_2(\xi,\eta)$. The following describes a procedure of determining, for example, the fringe order $m_1(\xi,\eta)$. A similar procedure is employed to determine the fringe order $m_2(\xi,\eta)$.

For example, in the case of "$\phi_1-\phi_2<-\pi$", "$m_1-m_2=-1$". In this case, $m_1$ is expressed by Expression (M6) given below:

$$m_1 = (\Delta d/\Delta\lambda)\cdot(\lambda_2/\Delta\lambda) \qquad (M6)$$

$$= (\lambda_1\times\phi_1 - \lambda_2\times\phi_2)/2\pi(\lambda_2-\lambda_1) - \lambda_2/(\lambda_2-\lambda_1)$$

In the case of "$\pi<\phi_1-\phi_2<\pi$", "$m_1-m_2=0$". In this case, $m_1$ is expressed by Expression (M7) given below:

$$m_1 = \Delta d/\Delta\lambda \qquad (M7)$$

$$= (\lambda_1\times\phi_1 - \lambda_2\times\phi_2)/2\pi(\lambda_2-\lambda_1)$$

In the case of "$\phi_1-\phi_2>\pi$", "$m_1-m_2=+1$". In this case, $m_1$ is expressed by Expression (M8) given below:

$$m_1 = (\Delta d/\Delta\lambda) + (\lambda_2/\Delta\lambda) \qquad (M8)$$

$$= (\lambda_1\times\phi_1 - \lambda_2\times\phi_2)/2\pi(\lambda_2-\lambda_1) + \lambda_2/(\lambda_2-\lambda_1)$$

The height information $z(\xi,\eta)$ is obtained according to Expression (M2) or Expression (M3) given above, based on the fringe order $m_1(\xi,\eta)$ or the fringe order $m_2(\xi,\eta)$ obtained as described above.

As described above in detail, the configuration of one or more embodiments allows for height measurement exceeding the measurement range with regard to each of the coordinate positions in the measurement area on the work W. This configuration is simplified without requiring any large-scaled moving mechanism such as to move the work and is not affected by the vibration or the like of the moving mechanism, and accordingly achieves the improvement of the measurement accuracy.

Furthermore, the configuration of one or more embodiments enables all the interference fringe images required for the measurement to be obtained by the less number of times of imaging and thereby enhances the measurement efficiency.

Additionally, the configuration of one or more embodiments first obtains the intensity image data at a plurality of positions in the z direction with regard to not the entire measurement area on the work W but with regard to only a specific area V that is part of the measurement area set in advance, specifies the position of the work W in the z direction based on the focusing state of the obtained intensity image data, subsequently obtains the intensity image data at a plurality of positions in the z direction with regard to each of the coordinate positions in the entire measurement area, on the basis of the specified position, and then performs measurement.

This configuration reduces the load of the process of obtaining data required for three-dimensional measurement with regard to the measurement area and shortens the time period required for this process. As a result, the configuration of one or more embodiments improves the measurement accuracy and enhances the measurement efficiency.

Moreover, the configuration of one or more embodiments causes the first light having the wavelength $\lambda1$ to enter the first face 20a of the polarizing beam splitter 20 and causes the second light having the wavelength $\lambda2$ to enter the second face 20b of the polarizing beam splitter 20 and thereby enables the reference light and the measurement light with regard to the first light and the reference light and the measurement light with regard to the second light to be split into different polarized light components (P-polarized light or S-polarized light). The first light and the second light entering the polarizing beam splitter 20 accordingly do not interfere with each other but are separately emitted from the polarizing beam splitter 20. The configuration of one or more embodiments accordingly does not require to use a predetermined separation unit to separate the light emitted from the polarizing beam splitter 20 into first light and second light.

As a result, the configuration of one or more embodiments enables the two different types of lights having the wavelengths close to each other to be used as the first light and the second light and further expands the measurement range in three-dimensional measurement. Additionally, the configuration of one or more embodiments enables imaging of the output light with regard to the first light and imaging of the output light with regard to the second light to be performed simultaneously. This shortens the total imaging time and enhances the measurement efficiency.

Additionally, the configuration of one or more embodiments is provided with the objective lens 21 that causes light (reference light) emitted from the third face 20c of the polarizing beam splitter 20 to be directed toward the reference plane 25 such as to irradiate the reference plane 25 and with the objective lens 22 that causes light (measurement light) emitted from the fourth face 20d of the polarizing beam splitter 20 to be directed toward the work W such as to irradiate the work W. The configuration of one or more embodiments is also provided with the imaging lens 30A that causes linearly polarized light (the reference light component and the measurement light component of the first light) emitted from the second face 20b of the polarizing beam splitter 20 to be imaged on the first camera 33A and with the imaging lens 30B that causes linearly polarized light (the reference light component and the measurement light component of the second light) emitted from the first face 20a of the polarizing beam splitter 20 to be imaged on the second camera 33B.

Compared with the conventional configuration that does not use the object lens and the like, this configuration increases a change in the luminance value even at an identical reconstruction position having an identical relative distance (reconstruction distance) from the optimum focusing position as shown in the table of FIG. 21 in the process of step S5 described above (the process of determining the optimum focusing position with regard to the specific area V) and in the process of step S8 described above (the process of determining the optimum focusing position with regard to each of the coordinate positions in the measurement area on the work W).

As a result, this configuration facilitates the specification of the optimum focusing position and is unlikely to be affected by the noise or the like and thereby achieves improvement of the measurement accuracy.

The present disclosure is not limited to the description of the above embodiments but may be implemented, for example, by configurations described below. The present disclosure may also be naturally implemented by applications and modifications other than those illustrated below.

(a) The work W as the object to be measured or the measurement object is not limited to the wafer substrate 100 illustrated in the above embodiments. For example, the work W (measurement object) may be a printed circuit board with solder paste printed thereon.

According to a modified configuration, the three-dimensional measurement device 1 may be provided in a bump inspection device or a solder printing inspection device that is equipped with an inspection unit configured to perform an inspection for the good/poor quality of a bump or solder paste as a measurement target according to preset criteria of good/poor quality judgment.

(b) The embodiments described above employ the phase shift method using a plurality of image data as the method of reconstruction from interference fringe images (i.e., the method of obtaining the complex amplitude data). This is, however, not essential, but another method may be employed. For example, a Fourier transform method using one image data may be employed.

The method of reconstruction is also not limited to the method of reconstruction using the complex amplitude data, but another reconstruction method may be employed.

The calculation of light propagation is also not limited to the convolution method illustrated in the above embodiments, but another method, for example, an angular spectrum method, may be employed.

(c) The configuration of the interference optical system (the predetermined optical system) is not limited to the configuration described in the above embodiments. For example, the above embodiments employ the optical configuration of the Michelson interferometer for the interference optical system. This is, however, not essential. The interference optical system may employ another optical configuration that splits incident light into reference light and measurement light and performs measurement of the work W, for example, the optical configuration of a Mach-Zehnder interferometer or a Fizeau interferometer.

(d) The above embodiments are configured to perform measurement of the work W by using two different types of lights having different wavelengths. This is, however, not essential. A modification may be configured to perform measurement of the work W by using only one type of light.

The configuration of using the two different types of lights having different wavelengths is not limited to the configuration described in the above embodiments. Like the conventional three-dimensional measurement device, a modified configuration may cause a combined light of a first wavelength light and a second wavelength light to enter an interference optical system, use a predetermined optical separation unit (for example, a dichroic mirror) to separate an interference light emitted from the interference optical system by wavelength separation to obtain an interference light with regard to the first wavelength light and an interference light with regard to the second wavelength light, and perform measurement of the work W, based on interference fringe images obtained by individually imaging the interference lights with regard to the respective wavelength lights.

Another modified configuration may use three or more different types of lights of different wavelengths to perform measurement of the work W by combining the configuration of causing a combined light of two different types of lights of different wavelengths emitted from two light sources to enter an interference optical system, using an optical separation unit to separate the interference light emitted from the interference optical system by wavelength separation and individually imaging interference lights with regard to the respective lights of the different wavelengths, with the configuration of the above embodiments.

(e) The configuration of the projection optical systems 2A and 2B is not limited to the configuration described in the above embodiments. For example, the above embodiments illustrate the configuration that causes the light having the wavelength $\lambda_1=1500$ nm to be radiated from the first projection optical system 2A and causes the light having the wavelength $\lambda_2=1503$ nm to be radiated from the second projection optical system 2B. The wavelengths of the respective lights are, however, not limited to this example. In this regard, however, a wavelength difference between two lights may be reduced, in order to expand the measurement range.

The light emitters 11A and 11B according to the above embodiments are configured to employ the laser light sources and emit the laser lights. This is, however, not essential, but another configuration may be employed. The configuration employable is required to emit light having a high coherence (high coherent light) such as to make at least interference.

For example, a modified configuration may enhance the coherence and emit the coherent light by combining an incoherent light source such as an LED light source with a bandpass filter or a special filter that allows for transmission of only a specific wavelength.

(f) The above embodiments are configured to obtain the four different interference fringe images having the phases differing by 90 degrees each, with regard to each of the first light and the second light. The number of phase shifts and the amount of phase shift are, however, not limited to those of the above embodiments. For example, a modification may be configured to obtain three different interference fringe images having phases differing by 120 degrees (or 90 degrees) each and to perform measurement of the work W.

(g) The above embodiments employ the polarizing plates 32A and 32B configured to change the direction of the transmission axis, as the phase shift unit. The configuration of the phase shift unit is, however, not limited to the embodiments.

For example, one employable configuration may move the reference plane 25 along an optical axis by a piezoelectric element or the like, so as to physically change the optical path length.

This employable configuration or the configuration of the above embodiments, however, takes a certain time period to obtain all the interference fringe images required for measurement. This increases the measurement time and is likely to lower the measurement accuracy, due to the influence of the fluctuation of the air, the vibration or the like.

According to a modified configuration, for example, the first imaging system 4A may be provided with a spectroscopic unit (for example, a prism) configured to split the combined light (the reference light component and the measurement light component) with regard to the first light transmitted through the quarter-wave plate 31A into four lights and may also be provided with a filter unit configured to provide different phase differences to the four lights emitted from the spectroscopic unit, in place of the first polarizing plate 32A, as the phase shift unit. The modified configuration may use the first camera 33A (or a plurality of cameras) to simultaneously take images of the four lights transmitted through the filter unit. A similar configuration may also be applied for the second imaging system 4B.

A special camera equipped with polarizing plates of different angles for respective pixels of an imaging element may be used, instead of the above configuration.

Figure 13:
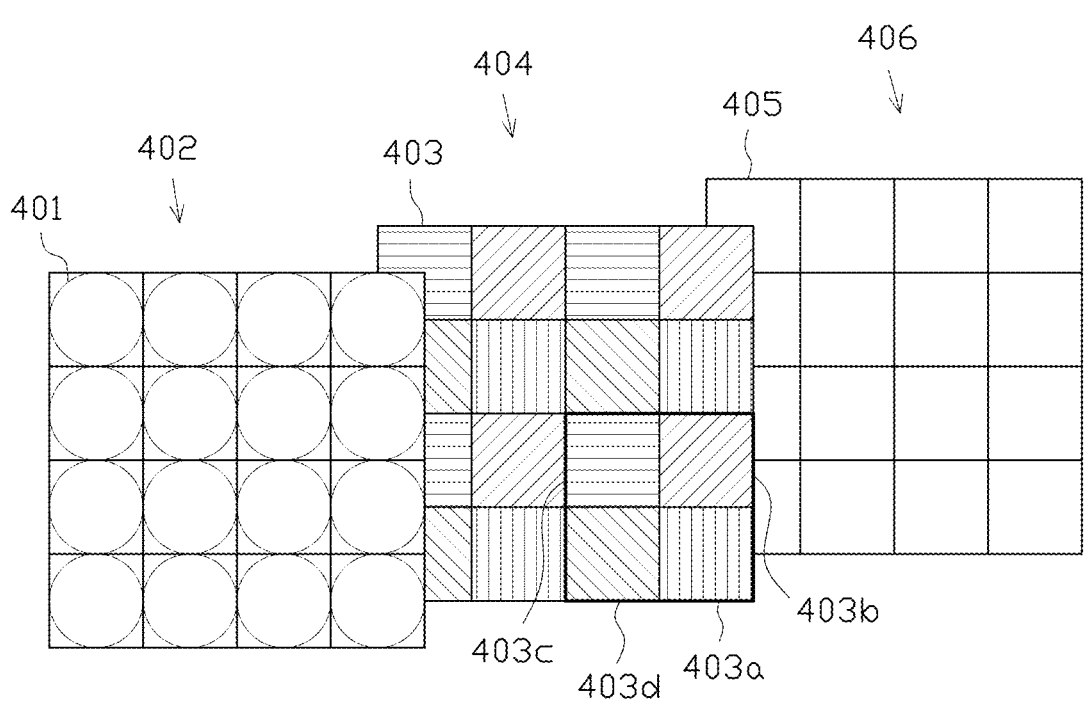
FIG. 13 is a schematic configuration diagram illustrating a camera according to another example of one or more embodiments.

For example, as shown in FIG. 13, the camera used may include a lens unit 402 that includes microlenses 401 arranged in a matrix to enhance the light condensing efficiencies of respective pixels; a filter unit 404 that includes polarizing plates 403 arranged in a matrix to allow for selective transmission of a predetermined component of the lights emitted from the respective microlenses 401 and that serves as the filter unit; and an imaging element 406 that includes a plurality of pixels 405 arranged in a matrix to respectively receive the lights transmitted through the respective polarizing plates 403.

The polarizing plates 403 constituting the filter unit 404 are comprised of four different types of polarizing plates 403a, 403b, 403c and 403d that have different directions of transmission axis by 45 degrees each. More specifically, the polarizing plates 403 are comprised of first polarizing plates 403a having the direction of the transmission axis of 0 degree, second polarizing plates 403b having the direction of the transmission axis of 45 degrees, third polarizing plates 403c having the direction of the transmission axis of 90 degrees, and fourth polarizing plates 403d having the direction of the transmission axis of 135 degrees.

The filter unit 404 is configured such that sets of polarizing plates (shown by a thick frame portion in FIG. 13) where four different types of polarizing plates 403a, 403b, 403c and 403d are arrayed in a predetermined sequence in a two by two matrix, are arranged in a matrix.

Using such a camera allows for calculation of the phase shift in four adjacent pixels. Instead of using the adjacent pixels, a modified method may decompose an original image into images of 0 degree, 45 degrees, 90 degrees and 135 degrees, generate four images by enlarging the size of the decomposed images to the size of the original image, and perform calculation of the phase shift with regard to each pixel. A method employed for the enlargement may be an interpolation technique by a bilinear method or a bicubic method, but this method is not essential.

This configuration enables all the interference fringe images required for measurement to be obtained simultaneously. More specifically, this configuration enables a total of eight different interference fringe images with regard to the two different types of lights to be obtained simultaneously. As a result, this configuration improves the measurement accuracy and significantly shortens the total imaging time so as to remarkably enhance the measurement efficiency.

(h) The above embodiments are configured to obtain the complex amplitude data and the like at every measurement range interval in height measurement in the process of determining the position of the work W in the z direction (the optimum focusing position with regard to the specific area V). This configuration is, however, not essential. For example, a modified configuration may obtain the complex amplitude data and the like at every focusing range interval.

(i) The above embodiments are configured to perform the three-dimensional measurement at step S10, based on the complex amplitude data of the entire measurement area obtained at step S6. A modification may be configured to obtain an intensity image of the entire measurement area and perform two-dimensional measurement, based on the complex amplitude data of the entire measurement area obtained at step S6, in addition to the three-dimensional measurement.

In the case of obtaining the intensity image of the entire measurement area, different data may be used according to a difference in the focusing position in the direction of the optical axis at each of the coordinate positions in the measurement area. For example, data at a first position in the direction of the optical axis may be used with regard to a first area included in the measurement area, and data at a second position in the direction of the optical axis may be used with regard to a second area included in the measurement area. This enables a focused intensity image to be obtained over the entire measurement area even in the case where there is a height difference in the measurement area, for example, due to a warp or an inclination of the object to be measured or the measurement object.

Figure 10:
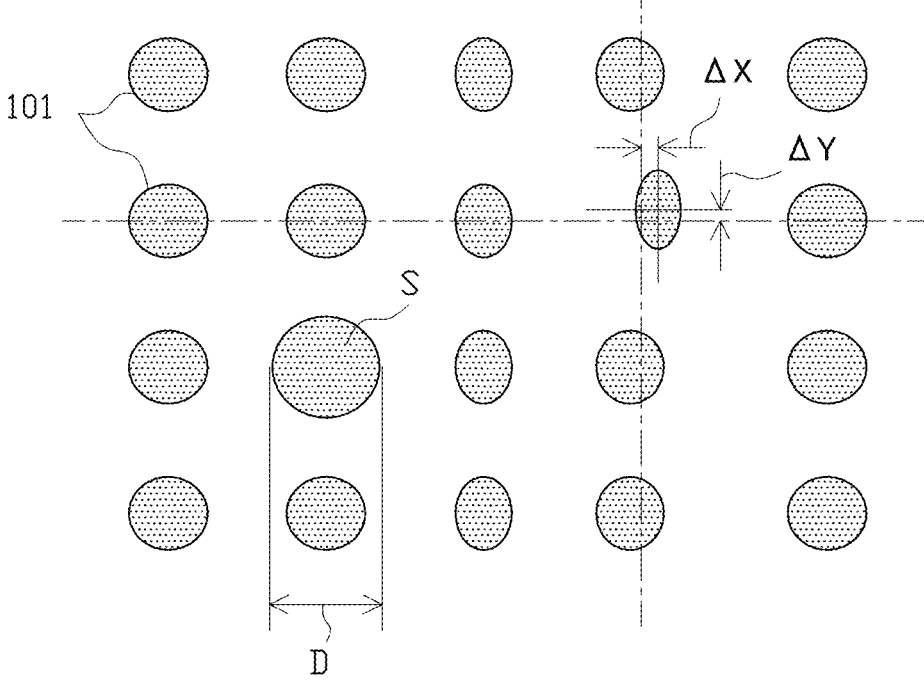
FIG. 10 is a schematic diagram illustrating two-dimensional measurement of bumps.

A procedure of the two-dimensional measurement may compare positional deviations $\Delta x$ and $\Delta y$, an outer diameter D, an area S or the like of a bump 101 (shown in FIG. 10) that is a measurement target, with a reference value set in advance, based on the result of the measurement and may perform two-dimensional inspection to determine the good/poor quality of the bump 101, based on the determination of whether the result of the comparison is within an allowable range.

In the case of performing both the two-dimensional measurement and the three-dimensional measurement at step S10, a procedure may perform a comprehensive inspection as a combination of multiple different measurements, for example, by specifying a location where the bump 101 as the measurement target is present, based on the result of the two-dimensional measurement (two-dimensional inspection) and then performing the three-dimensional measurement or by mapping the intensity image to three-dimensional data obtained by the three-dimensional measurement.

(j) In the configuration of the above embodiments, the objective lens 21 is placed between the polarizing beam splitter 20 (the third face 20c) and the quarter-wave plate 23, and the objective lens 22 is placed between the polarizing beam splitter 20 (the fourth face 20d) and the quarter-wave plate 24. The arrangement of the objective lenses 21 and 22 is, however, not limited to this configuration.

The configuration of the above embodiments may be replaced by, for example, a configuration that the objective lens 21 is placed between the quarter-wave plate 23 and the reference plane 25. Similarly, the configuration of the above embodiments may be replaced by, for example, a configuration that the objective lens 22 is placed between the quarter-wave plate 24 and the mounting portion 26 (the work W).

In the configuration of the above embodiments, the imaging lens 30A is placed between the second non-polarizing beam splitter 13B and the quarter-wave plate 31A, and the imaging lens 30B is placed between the first non-polarizing beam splitter 13A and the quarter-wave plate 31B. The arrangement of the imaging lenses 30A and 30B is, however, not limited to this configuration.

The configuration of the above embodiments may be replaced by, for example, a configuration that the imaging lens 30A is placed between the quarter-wave plate 31A and the first polarizing plate 32A or between the first polarizing plate 32A and the first camera 33A. Similarly, the configuration of the above embodiments may be replaced by, for example, a configuration that the imaging lens 30B is placed between the quarter-wave plate 31B and the second polarizing plate 32B or between the second polarizing plate 32B and the second camera 33B.

(k) The above embodiments are configured to specify the optimum focusing position with regard to the specific area V that is set in advance as a part in the measurement area on the work W, i.e., the position of the work W in the z direction, to subsequently obtain the complex amplitude data and the intensity image data at a plurality of positions in the z direction with regard to the entire measurement area, based on the specified position, and to perform the measurement.

This configuration is, however, not essential. A modified configuration may omit the process of specifying the optimum focusing position with regard to the specific area V but may directly obtain the complex amplitude data and the intensity image data at a plurality of positions in the z direction with regard to each of the coordinate positions in the entire measurement area on the work W, on the basis of the device origin of the three-dimensional measurement device 1, and perform the measurement.

Figure 14:
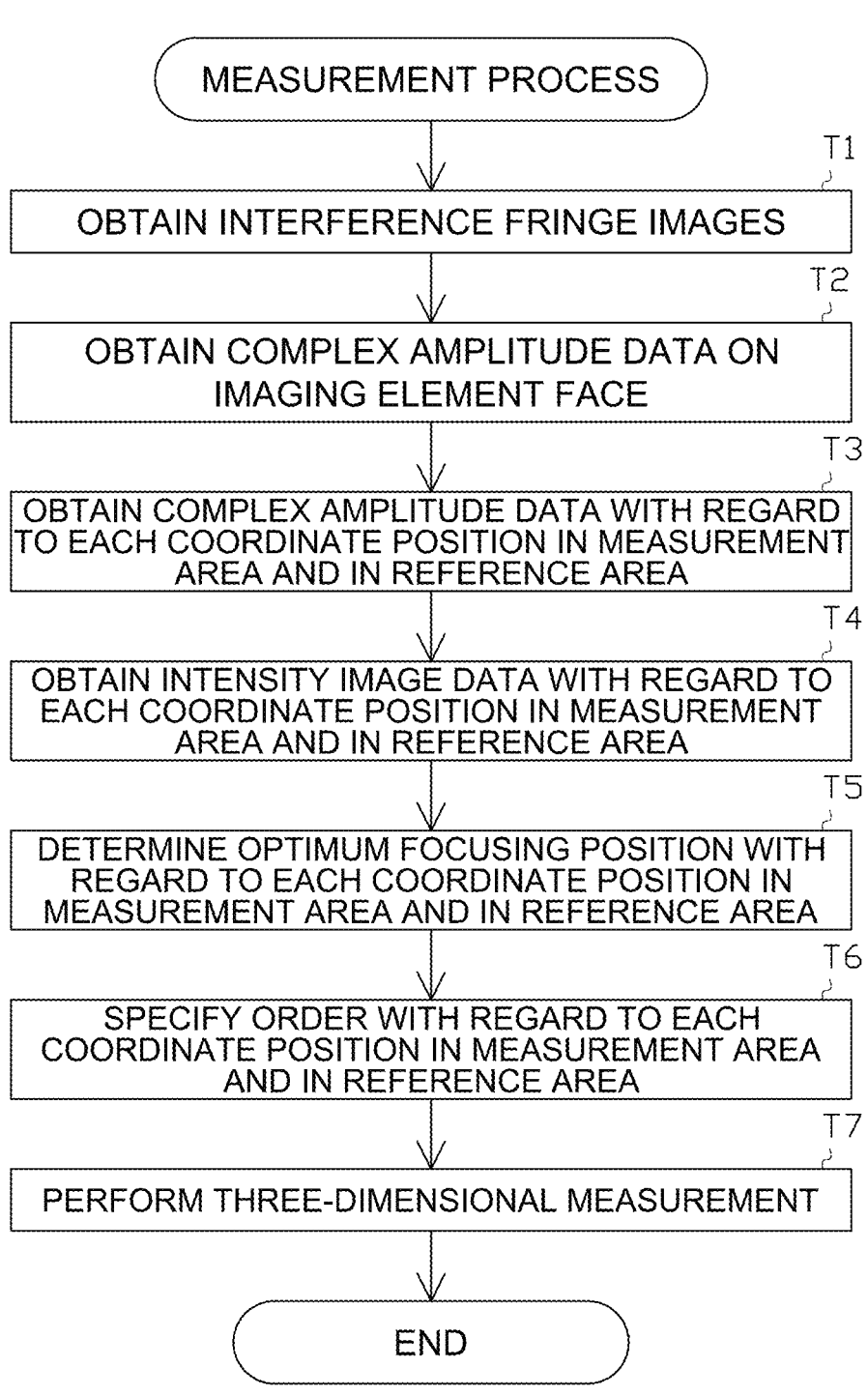
FIG. 14 is a flowchart showing the flow of a measurement process according to another example of one or more embodiments.

The following describes one or more embodiments of this configuration in detail with reference to FIG. 14. FIG. 14 is a flowchart showing the flow of a measurement process according to one or more embodiments. With regard to overlapping portions with those of the above embodiments, the detailed description is omitted with using like names of members and like reference signs. The following mainly describes different portions from those of the above embodiments.

At first step T1, the control device 5 performs a process of obtaining interference fringe images with regard to a predetermined measurement area on the work W. More specifically, the control device 5 obtains all the image data required for measurement with regard to the predetermined measurement area on the work W (a total of eight interference fringe images consisting of four interference fringe images of different phases with regard to the first light and four interference fringe images of different phases with regard to the second light). The processing of step T1 is similar to the processing of step S1 described in the above embodiments and is thus not described in detail.

At subsequent step T2, the control device 5 performs a process of obtaining complex amplitude data of light on the imaging element 33Aa-face or on the imaging element 33Ba-face.

The control device 5 obtains complex amplitude data $Eo(x,y)$ of light on the imaging element 33Aa-face or on the imaging element 33Ba-face with regard to each of the first light and the second light, based on the four interference fringe images with regard to the first light and the four interference fringe images with regard to the second light stored in the image data storage device 54. The processing of step T2 is similar to the processing of step S2 described in the above embodiments and is thus not described in detail.

At subsequent step T3, the control device 5 performs a process of obtaining complex amplitude data at a plurality of positions in the z direction, with regard to each of coordinate positions in a predetermined measurement area and in a predetermined reference area on the work W, at every predetermined measurement range interval within a predetermined range in the z direction where a predetermined measurement target on the work W (for example, a bump 101 on a wafer substrate 100) is likely to be present, on the basis of the device origin that is the standard of height measurement in the three-dimensional measurement device 1. The method of obtaining the complex amplitude data at the plurality of positions in the z direction is similar to the method described in the above embodiments and is thus not described in detail.

The "reference area" denotes an area including a reference plane for height measurement of the predetermined measurement target. For example, when the work W is a wafer substrate 100 as shown in FIG. 8, the reference area is an area including a substrate upper face (or an upper face of a pattern portion 102) that is likely to serve as a reference plane for height measurement of a predetermined bump 101 as a measurement target.

At subsequent step T4, the control device 5 performs a process of obtaining intensity image (luminance image) data at a plurality of positions in the z direction with regard to each of the coordinate positions in the predetermined measurement area and in the predetermined reference area on the work W, based on the complex amplitude data obtained at step T3 described above. Accordingly, the function of performing the series of processes of steps T3 and T4 described above configures the image data obtaining unit according to one or more embodiments. The method of obtaining the intensity image data from the complex amplitude data is similar to the method described in the above embodiments and is thus not described in detail.

At subsequent step T5, the control device 5 performs a process of determining the optimum focusing position (the focusing position in the direction of the optical axis) with regard to each of the coordinate positions in the predetermined measurement area and in the predetermined reference area on the work W, based on the intensity image data at the plurality of positions in the z direction obtained at step T4 described above. The function of performing this process of step T5 configures the focusing position determination unit according to one or more embodiments. The method of determining the optimum focusing position from the intensity image data at the plurality of positions in the z direction is similar to the method described in the above embodiments and is thus not described in detail.

At subsequent step T6, the control device 5 performs a process of specifying an order corresponding to the optimum focusing position with regard to each of the coordinate positions in the predetermined measurement area and in the predetermined reference area on the work W determined at step T5, as an order of a measurement range with regard to each of the coordinate positions. The function of performing this process of step T6 configures the order specification unit according to one or more embodiments. The method of specifying the order of the measurement range is similar to the method described in the above embodiments and is thus not described in detail.

At subsequent step T7, the control device 5 performs a three-dimensional measurement process. The function of performing this process of step T7 configures the three-dimensional measurement unit according to one or more embodiments.

Like the three-dimensional measurement process of the above embodiments, the control device 5 first calculates a phase $\phi(\xi,\eta)$ of the measurement light and an amplitude $A(\xi,\eta)$ of the measurement light from the complex amplitude data $Eo(\xi,\eta)$ at the optimum focusing position with regard to each of the coordinate positions in the measurement area and in the predetermined reference area determined at step T5. The function of performing the series of reconstruction process to calculate the phase $\phi(\xi,\eta)$ that is the phase information of the measurement light configures the phase information obtaining unit according to one or more embodiments.

The control device 5 subsequently performs a phase-height conversion process and calculates height information $z(\xi,\eta)$ in the measurement range that shows the surface roughness or the concavo-convex configuration on the surface of the work W (the measurement area and the reference area) in a three-dimensional manner.

The control device 5 then obtains true height data (actual height) 7b with regard to each coordinate position, based on the height information $z(\xi,\eta)$ in the measurement range calculated as described above and the order of the measurement range with regard to the coordinate position specified at step T6.

One or more embodiments are configured to calculate an average value of heights in reference areas (for example, a plurality of positions on a substrate upper face or upper faces of a plurality of pattern portions 102) present in the periphery of each measurement target (for example, one bump 101) and to subsequently calculate the height of the measurement target based on the calculated average value.

A modification may be configured to create a height map of a reference area (for example, a substrate upper face or an upper face of a pattern portion 102) in a predetermined range on a work W (for example, a wafer substrate 100) including a plurality of measurement targets (for example, a plurality of bumps 101) and to subtract an absolute height of the reference area at the position of a predetermined measurement target from an absolute height of the predetermined measurement target, so as to calculate the height of the measurement target relative to a reference plane (the reference area).

This configuration allows for the more appropriate height measurement of the measurement target even in the case of an inclination of the reference plane or the measurement area due to, for example, a warp of the work W or inclination of the mounting portion 26 (mounting plane).

(l) The above embodiments are configured to obtain the intensity image data at a plurality of positions in the z direction at every interval of one period of the measurement range and determine the focusing state. This configuration may be replaced by a configuration of obtaining intensity image data at a plurality of positions in the z direction at every interval of n periods of the measurement range (where n is a natural number of not less than 2) and determine the focusing state.

Like a concrete example shown in FIG. 12, for example, a modified configuration may obtain intensity image data at a plurality of positions in the z direction at every interval of two periods of the measurement range and determine the focusing state.

In a "Case 1" shown in FIG. 12, among intensity image data reconstructed at height positions $H_3$, $H_1$, $H_{-1}$, and $H_{-3}$ (reconstructed images [1] to [4]) with regard to a predetermined coordinate position, the intensity image data reconstructed at the height position $H_3$ (reconstructed image [1]) has a maximum luminance value of "135". Accordingly, the height position $H_3$ is specified as the optimum focusing position with regard to this coordinate position.

Similarly, in a case "2" shown in FIG. 12, among intensity image data reconstructed at height positions $H_3$, $H_1$, $H_{-1}$, and $H_{-3}$ (reconstructed images [1] to [4]) with regard to a predetermined coordinate position, the intensity image data reconstructed at the height position $H_1$ (reconstructed image [2]) has a maximum luminance value of "128". Accordingly, the height position $H_1$ is specified as the optimum focusing position with regard to this coordinate position.

A modification may be configured to obtain interpolation data at height positions $H_2$, $H_0$, and $H_{-2}$, based on the intensity image data reconstructed at the height positions $H_3$, $H_1$, $H_{-1}$, and $H_{-3}$ (the reconstructed images [1] to [4]) and specify the optimum focusing position, based on the interpolation data and the reconstructed intensity image data.

Another modification may be configured to obtain intensity image data at a plurality of positions in the z direction at every reconstruction interval that is shorter than one period of the measurement range and determine the focusing state (reconstruction interval dz<measurement range interval R).

(m) The above embodiments are configured to obtain the intensity image data at a plurality of positions in the z direction with regard to each of the coordinate positions in the measurement area, determine the focusing state, and perform measurement. This configuration is, however, not essential. A modification may be configured to obtain intensity image data at one predetermined position in the z direction with regard to each of the coordinate positions in the measurement area, determine the focusing state (the focusing determination unit), and, when the intensity image data has a predetermined focusing state satisfying a predetermined condition (for example, when the intensity image data has a luminance of not lower than a predetermined reference value), perform three-dimensional measurement with regard to the coordinate position, based on phase information of light obtained from complex amplitude data at the predetermined position in the z direction and an order corresponding to the predetermined position in the z direction.

Figure 15:
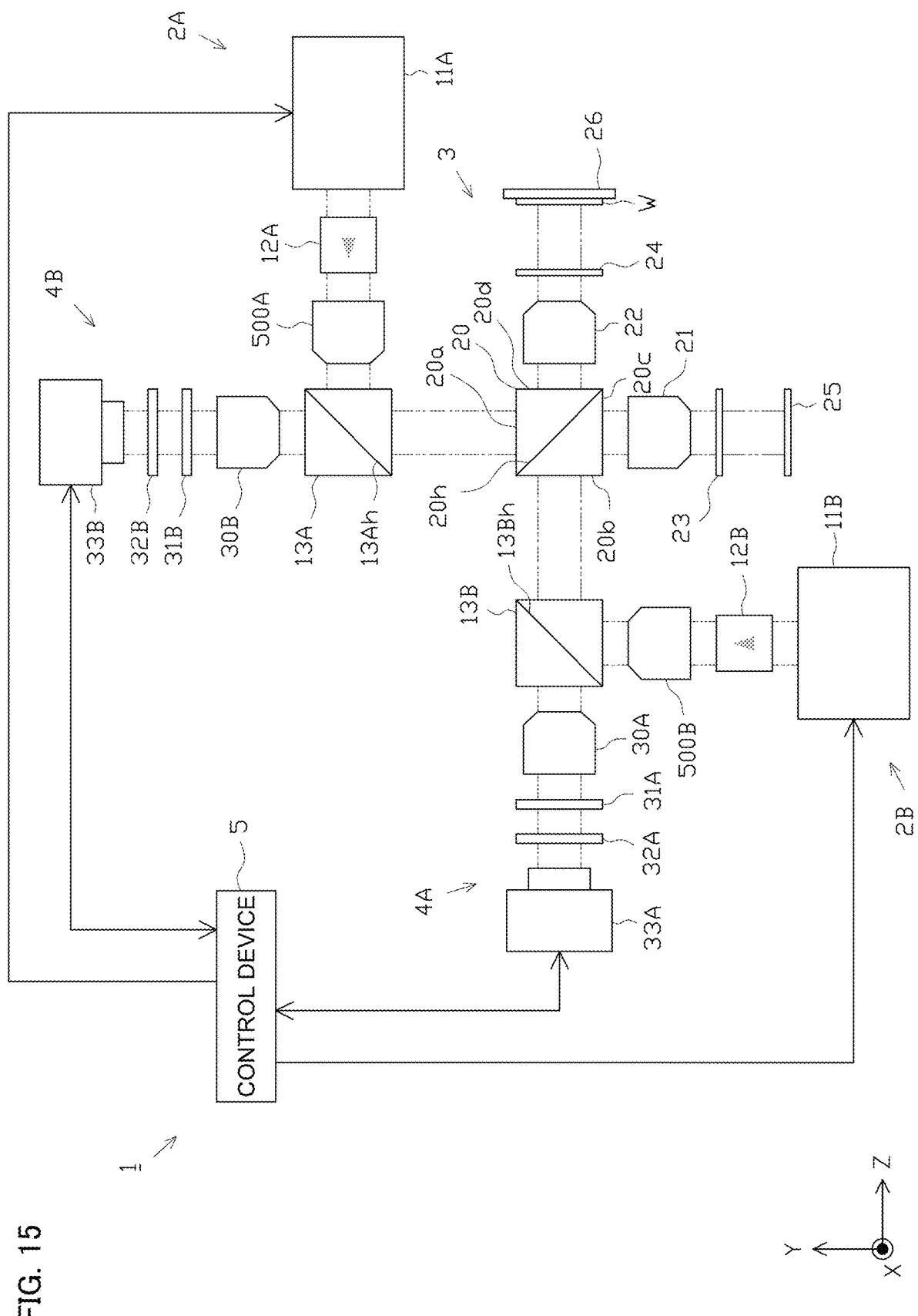
FIG. 15 is a schematic configuration diagram illustrating a three-dimensional measurement device according to another example of one or more embodiments.
Figure 16:
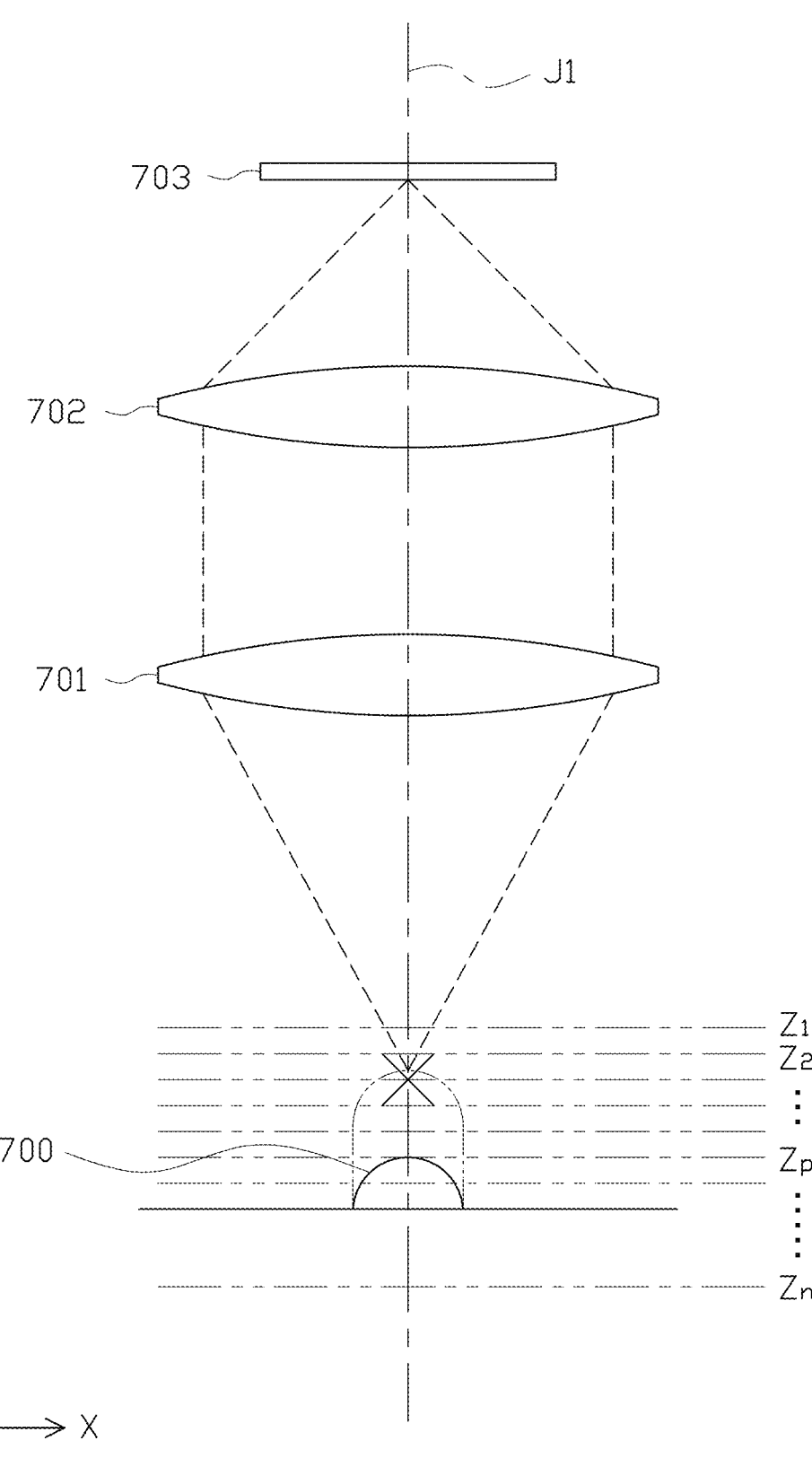
FIG. 16 is a diagram illustrating an optical relationship between an objective lens and an imaging lens.
Figure 17:
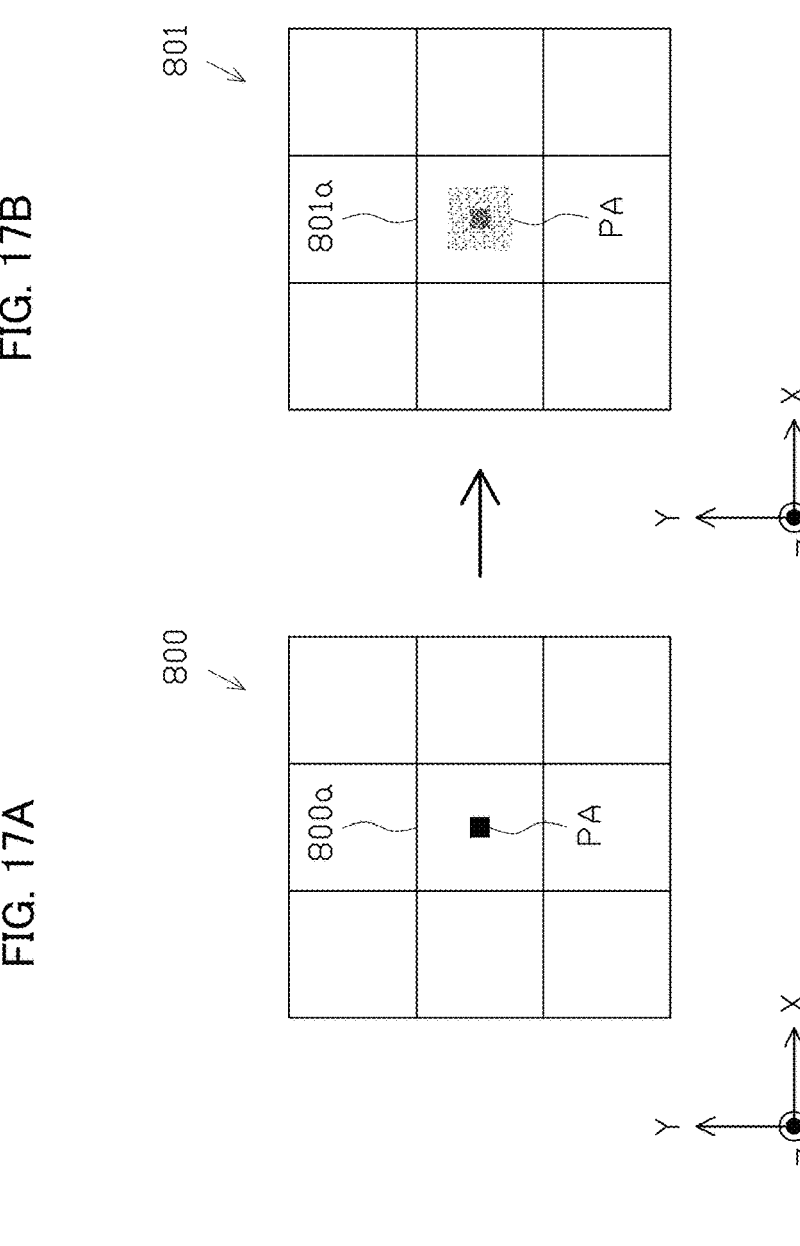
FIG. 17A is a diagram illustrating a reconstruction state of a measurement point at a focusing position.
FIG. 17B is a diagram illustrating a reconstruction state of a measurement point at a position deviated by a first predetermined amount from the focusing position.
FIG. 17C is a diagram illustrating a reconstruction state of a measurement point at a position deviated by a second predetermined amount from the focusing position.
Figure 18:
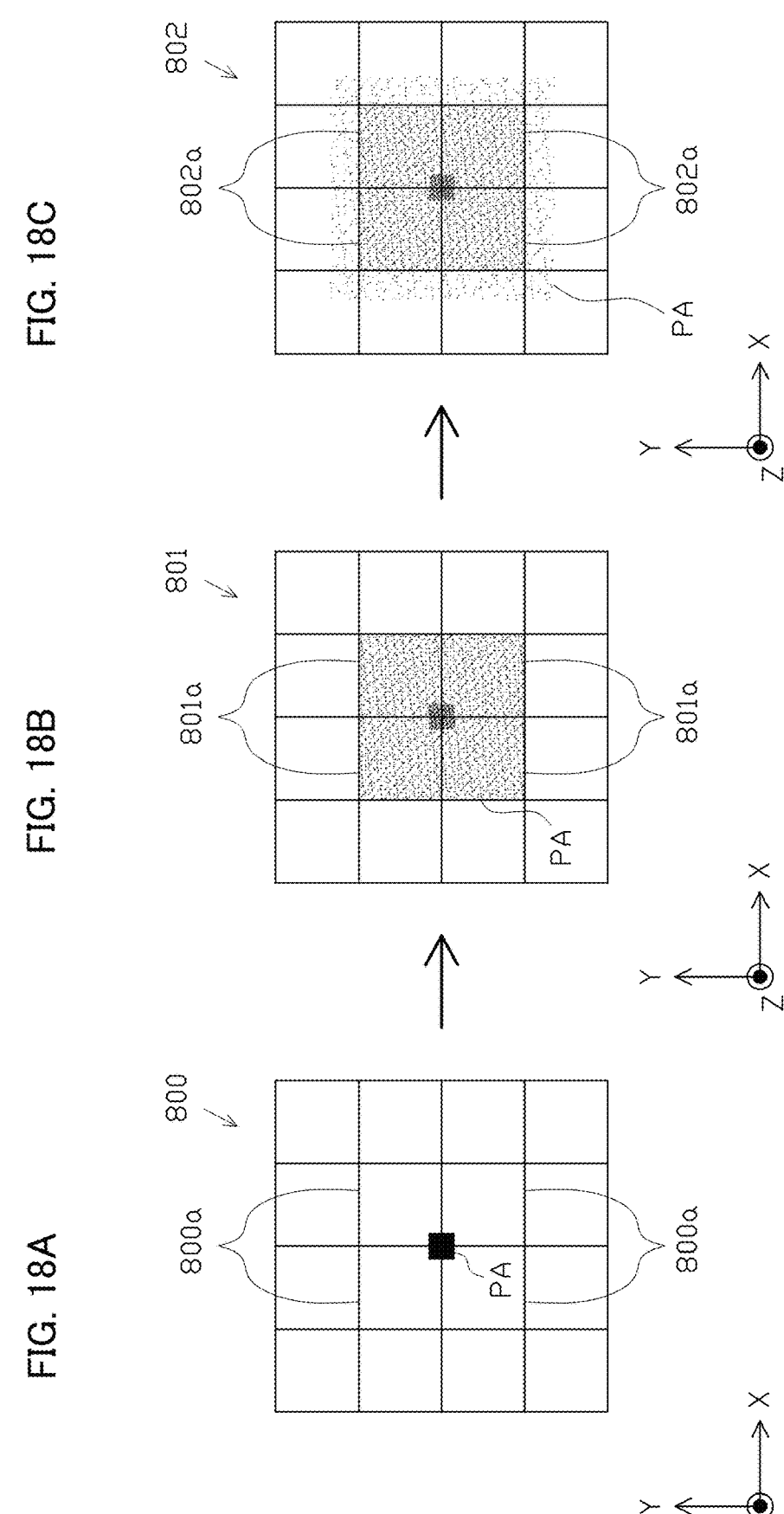
FIG. 18A is a diagram illustrating a reconstruction state of a measurement point at a focusing position.
FIG. 18B is a diagram illustrating a reconstruction state of a measurement point at a position deviated by a first predetermined amount from the focusing position.
FIG. 18C is a diagram illustrating a reconstruction state of a measurement point at a position deviated by a second predetermined amount from the focusing position.
Figure 19:
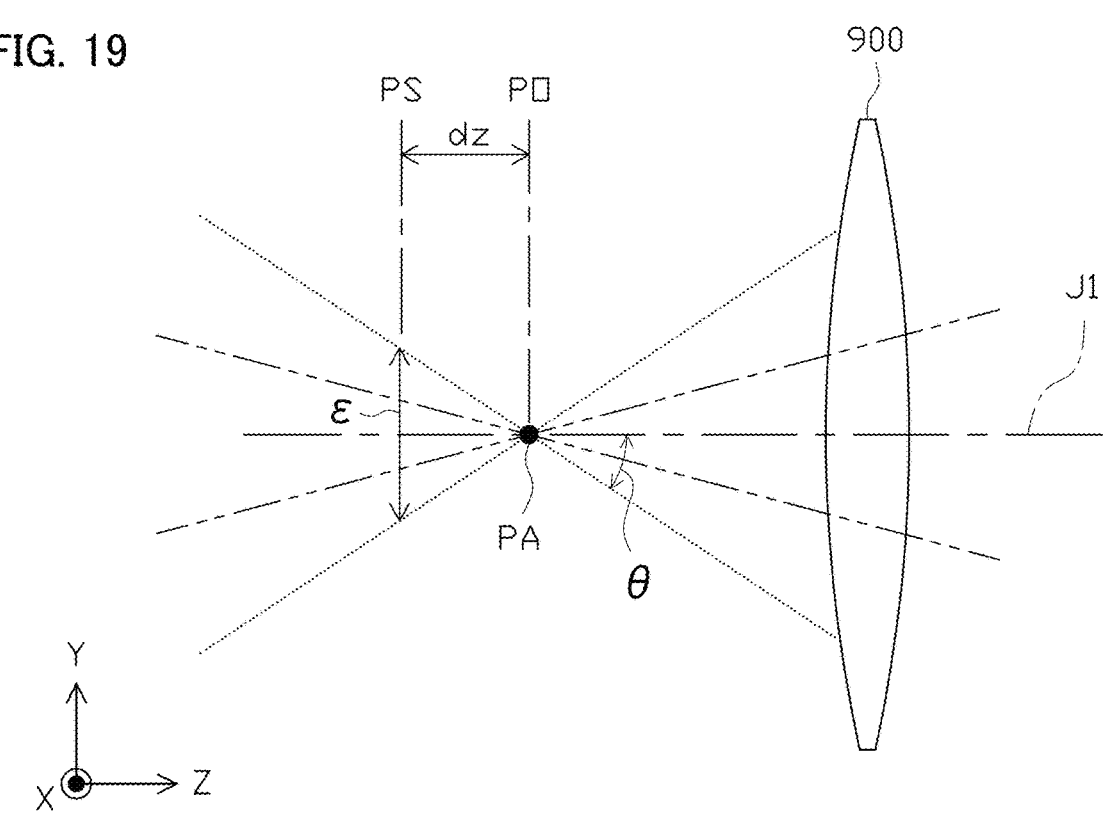
Figure 20:
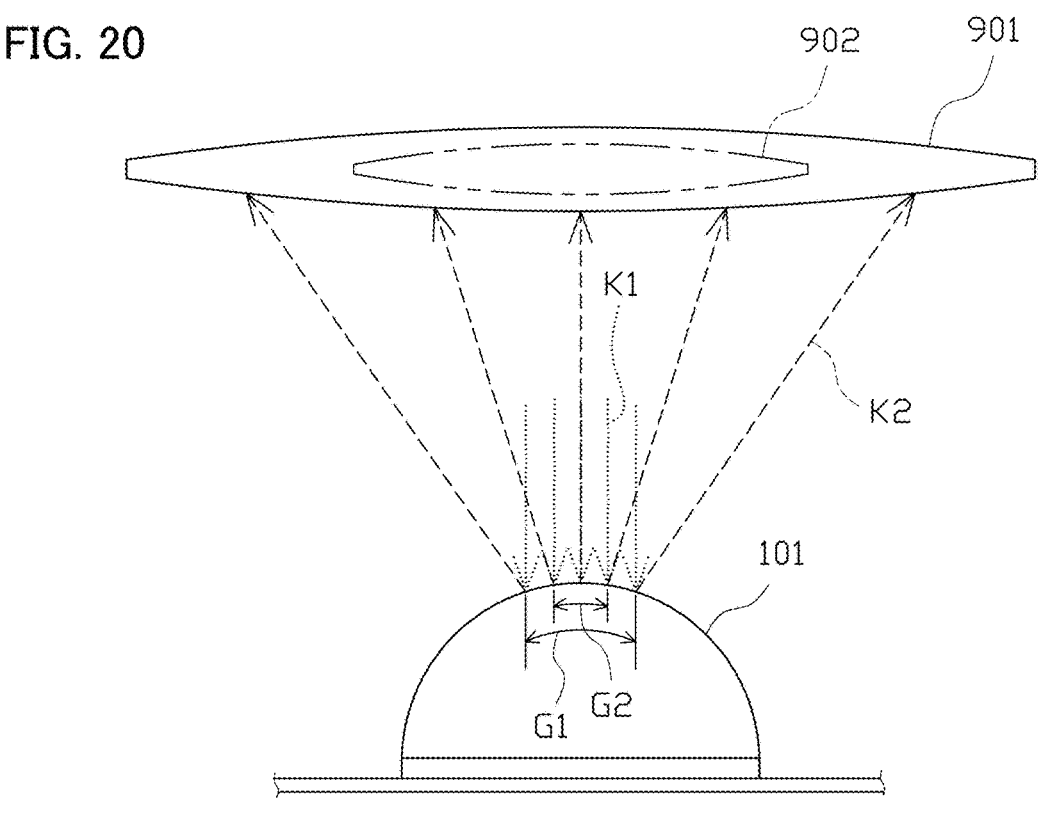
FIG. 20 is a schematic diagram illustrating a difference between a measurable range in the case of using an objective lens of a large numerical aperture and a measurable range in the case of using an objective lens of a small numerical aperture.

(n) A modification may be configured to add projection lenses to the configuration of the above embodiments. For example, as shown in FIG. 15, a projection lens 500A may be provided between the first light isolator 12A and the first non-polarizing beam splitter 13A in the first projection optical system 2A, and a projection lens 500B may be provided between the second light isolator 12B and the second non-polarizing beam splitter 13B in the second projection optical system 2B.

In the configuration provided with the objective lenses 21 and 22 like the above embodiments, the light (measurement light) which the work W is irradiated with is gathered at one point (in a narrow range). This is likely to narrow a measurement area that is measurable by one measurement.

In the above modified configuration, on the other hand, the projection lenses 500A and 500B serve to collect the lights emitted from the light emitters 11A and 11B toward the objective lenses 21 and 22. This enables a wider range of the work W to be irradiated with uniform parallel light and thereby enables a wider range to be measured more uniformly by one measurement.

As a result, this further improves the measurement accuracy and further enhances the measurement efficiency.

The arrangement of the projection lenses 500A and 500B is, however, not limited to the above configuration. For example, the above configuration may be replaced by a configuration that the projection lens 500A is placed between the first light emitter 11A and the first light isolator 12A or is placed between the first non-polarizing beam splitter 13A and the polarizing beam splitter 20 (the first face 20a).

Similarly, the above configuration may be replaced by a configuration that the projection lens 500B is placed between the second light emitter 11B and the second light isolator 12B or is placed between the second non-polarizing beam splitter 13B and the polarizing beam splitter 20 (the second face 20b).

(o) The objective lenses 21 and 22 used may be those having a numerical aperture NA satisfying Expression (01) given below, although this condition is not specifically referred to in the above embodiments:

$$NA > a/\sqrt{((dz)^2 + a^2)} \tag{01}$$

where a denotes a pixel size and dz denotes a reconstruction interval.

For example, in the case where it is required to specify a deviation of the reconstruction position from the optimum focusing position under the conditions of the pixel size a=2 [μm] and the reconstruction interval dz=3 [μm], the objective lenses 21 and 22 having the numerical aperture NA>0.5547 may be used.

In this regard, however, the reconstruction intervals dz is not less than 0 and does not exceed the measurement range interval R ($0 \leq dz \leq R$) in one or more embodiments. The numerical aperture NA may be larger as long as possible. Unless a special technique such as liquid immersion is employed, however, the upper limit of the numerical aperture NA is equal to 1 (refer to Expression (2) given above in the case of a refractive index n=1). Accordingly, the numerical aperture NA is not greater than 1 (NA 1) in one or more embodiments.

In the case of using the objective lenses 21 and 22 having a relatively small numerical aperture NA, even a relatively large reconstruction interval dz (relative distance from the optimum focusing position) is likely to reduce the degree of blurring of a measurement point and makes it difficult to specify the optimum focusing position.

In the case of using the objective lenses 21 and 22 having a relatively large numerical aperture NA as described above, on the other hand, reflected light that is reflected in a wide range such as a top portion of the bump 101 is more readily received by the objective lens 22. Even a small reconstruction interval dz is likely to increase the degree of blurring of the measurement point and makes it easier to specify the optimum focusing position.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1 . . . three-dimensional measurement device, 2A . . . first projection optical system, 2B . . . second projection optical system, 3 . . . interference optical system, 4A . . . first imaging system, 4B . . . second imaging system, 5 . . . control device, 11A . . . first light emitter, 11B . . . second light emitter, 12A . . . first light isolator, 12B . . . second light isolator, 13A . . . first non-polarizing beam splitter, 13B . . . second non-polarizing beam splitter, 20 . . . polarizing beam splitter, 20a . . . first face, 20c . . . third face, 20b . . . second face, 20d . . . fourth face, 21, 22 . . . objective lenses, 23, 24 . . . quarter-wave plates, 25 . . . reference plane, 26 . . . mounting portion, 30A, 30B . . . imaging lenses, 31A . . . quarter-wave plate, 31B . . . quarter-wave plate, 32A . . . first polarizing plate, 32B . . . second polarizing plate, 33A . . . first camera, 33B . . . second camera, 33Aa, 33Ba . . . imaging elements, 100 . . . wafer substrate, 101 . . . bump, 102 . . . pattern portion, R . . . measurement range interval, V . . . specific area, W . . . work

What is claimed is:

1. A three-dimensional measurement device, comprising:

an irradiator that emits a predetermined light;

an optical system that splits the predetermined light entering from the irradiator into two lights, irradiates a measurement object with one of the two lights as a measurement light and irradiates a reference plane with another of the two lights as a reference light, and combines the measurement light and the reference light with each other and emits a combined light;

a first objective lens for the measurement light that directs the measurement light toward the measurement object;

a second objective lens for the reference light that directs the reference light toward the reference plane;

a first imaging device:

comprises:

a filter unit that comprises multiple polarizing plate sets each including four polarizing plates of 0, 45, 90, and 135 degrees, wherein the multiple polarizing plate sets respectively correspond to multiple split lights output from a prism that splits the combined light of a first light;

a lens unit that comprises microlenses respectively corresponding to the polarizing plates included in the multiple polarizing plate sets; and an imaging element that comprises pixels respectively corresponding to the polarizing plates included in the multiple polarizing plate sets, and takes first interference fringe images of phases of 0, 45, 90, and 135 degrees;

a second imaging device:

comprises:

a filter unit that comprises multiple polarizing plate sets each including four polarizing plates of 0, 45, 90, and 135 degrees, wherein the multiple polarizing plate sets correspond to multiple split lights output from a prism that splits the combined light of a second light;

a lens unit that comprises microlenses respectively corresponding to the polarizing plates included in the multiple polarizing plate sets; and an imaging element that comprises pixels respectively corresponding to the polarizing plates included in the multiple polarizing plate sets, and takes second interference fringe images of phases of 0, 45, 90, and 135 degrees;

one or more imaging lenses that form images of the combined light on the first and second imaging devices; and a control device that executes three-dimensional measurement of a measurement area on the measurement object based on the first and second interference fringe images, wherein the control device is configured to:

obtain, by reconstruction, a plurality of pieces of intensity image data at predetermined positions with measurement range intervals along an optical axis for each coordinate in the measurement area, based on the first and second interference fringe image of the measurement area, identify a focusing position along the optical axis for a predetermined coordinate in the measurement area, based on the pieces of intensity image data with respect to the predetermined coordinate, identify, among orders respectively corresponding to the predetermined positions along the optical axis, an order corresponding to the focusing position, wherein the orders include zero as a reference position and positive and negative integers increasing and decreasing along the optical axis from zero, obtain, by reconstruction, phase information of light at the focusing position along the optical axis for each coordinate in the measurement area, based on the first and second interference fringe image of the measurement area, and based on the order and the phase information, identify an actual height of a surface of the measurement object, and execute three-dimensional measurement with respect to the predetermined coordinate, and at least one of the first and second objective lenses have a numerical aperture NA that satisfies expressions given below:

$$NA > a/\sqrt{((dz)^2 + a^2)}, \text{ and}$$

$$0 \le dz \le R,$$

where a denotes a pixel size, dz denotes a reconstruction interval indicating an amount of shift of a reconstruction position from the focusing position along the optical axis, the reconstruction position corresponding to one of the predetermined positions that respectively correspond to the orders, and R denotes each of the measurement range intervals.

2. The three-dimensional measurement device according to claim 1, wherein the irradiator comprises:

a first light emitter that emits a first light including a polarized light of a first wavelength and entering the optical system;

a second light emitter that emits a second light including a polarized light of a second wavelength and entering the optical system;

a first projection lens for the first light that is placed between the optical system and the first light emitter and collects the first light directed onto the first objective lens; and a second projection lens for the second light that is placed between the optical system and the second light emitter and collects the second light directed onto the second objective lens, the imaging lenses include:

a first imaging lens for first imaging that forms an image of the combined light of the first light on the first imaging device; and a second imaging lens for second imaging that forms an image of the combined light of the second light on the second imaging device.

3. The three-dimensional measurement device according to claim 2, wherein the measurement object is a wafer substrate with a bump formed on the wafer substrate.

4. The three-dimensional measurement device according to claim 1, wherein the measurement object is a wafer substrate with a bump formed on the wafer substrate.

5. A three-dimensional measurement device, comprising:

an irradiator that emits a predetermined light;

an optical system that splits the predetermined light entering from the irradiator into two lights, irradiates a measurement object with one of the two lights as a measurement light and irradiates a reference plane with another of the two lights as a reference light, and combines the measurement light and the reference light with each other and emits a combined light;

a first objective lens for the measurement light that directs the measurement light toward the measurement object;

a second objective lens for the reference light that directs the reference light toward the reference plane;

a first imaging device:

comprises:

a filter unit that comprises multiple polarizing plate sets each including four polarizing plates of 0, 45, 90, and 135 degrees, wherein the multiple polarizing plate sets respectively correspond to multiple split lights output from a prism that splits the combined light of a first light;

a lens unit that comprises microlenses respectively corresponding to the polarizing plates included in the multiple polarizing plate sets; and an imaging element that comprises pixels respectively corresponding to the polarizing plates included in the multiple polarizing plate sets, and takes first interference fringe images of phases of 0, 45, 90, and 135 degrees;

a second imaging device:

comprises:

a filter unit that comprises multiple polarizing plate sets each including four polarizing plates of 0, 45, 90, and 135 degrees, wherein the multiple polarizing plate sets correspond to multiple split lights output from a prism that splits the combined light of a first light;

a lens unit that comprises microlenses respectively corresponding to the polarizing plates included in the multiple polarizing plate sets; and an imaging element that comprises pixels respectively corresponding to the polarizing plates included in the multiple polarizing plate sets, and takes second interference fringe images of phases of 0, 45, 90, and 135 degrees;

one or more imaging lenses that form images of the combined light on the first and second imaging devices; and a control device that executes three-dimensional measurement of a measurement area on the measurement object based on the first and second interference fringe images, wherein the control device is configured to:

obtain, by reconstruction, a plurality of pieces of intensity image data at predetermined positions with measurement range intervals within a first range along an optical axis within a specific area set in advance in the measurement area, based on the first and second interference fringe images, identify a first focusing position along the optical axis within the specific area, based on the pieces of intensity image data with respect to the specific area, obtain, by reconstruction, a plurality of pieces of intensity image data at the predetermined positions with the measurement range intervals within a second range along the optical axis set based on the first focusing position, for each coordinate in the measurement area, based on the first and second interference fringe images of the measurement area, identify a second focusing position along the optical axis for a predetermined coordinate in the measurement area, based on the pieces of intensity image data with respect to the predetermined coordinate, identify, among orders respectively corresponding to the predetermined positions along the optical axis, an order corresponding to the second focusing position along the optical axis, wherein the orders include zero as a reference position and positive and negative integers increasing and decreasing along the optical axis from zero, obtain, by reconstruction, phase information of light at the second focusing position along the optical axis for each coordinate in the measurement area, based on the first and second interference fringe images of the measurement area, and based on the order and the phase information, identify an actual height of a surface of the measurement object, and execute three-dimensional measurement with respect to the predetermined coordinate, and at least one of the first and second objective lenses have a numerical aperture NA that satisfies expressions given below:

$$NA > a/\sqrt{((dz)^2 + a^2)}, \text{ and}$$

$$0 \leq dz \leq R,$$

where a denotes a pixel size, dz denotes a reconstruction interval indicating an amount of shift of a reconstruction position from the focusing position along the optical axis, the reconstruction position corresponding to one of the predetermined positions that respectively correspond to the orders, and R denotes each of the measurement range intervals.

6. The three-dimensional measurement device according to claim 5, wherein the measurement object is a wafer substrate with a bump formed on the wafer substrate.

\* \* \* \* \*